United States Patent
Mertens

(10) Patent No.: US 10,134,443 B2
(45) Date of Patent: Nov. 20, 2018

(54) METHODS AND APPARATUSES FOR PROCESSING OR DEFINING LUMINANCE/COLOR REGIMES

(71) Applicant: KONINKLIJKE PHILIPS N.V., Eindhoven (NL)

(72) Inventor: Mark Jozef Willem Mertens, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/134,496

(22) Filed: Apr. 21, 2016

(65) Prior Publication Data

US 2016/0234515 A1   Aug. 11, 2016

Related U.S. Application Data

(62) Division of application No. 13/577,930, filed as application No. PCT/IB2011/050767 on Feb. 24, 2011, now Pat. No. 9,595,297.

(30) Foreign Application Priority Data

Mar. 3, 2010   (EP) .................................... 10155277

(51) Int. Cl.
| | |
|---|---|
| H04N 19/186 | (2014.01) |
| H04N 19/182 | (2014.01) |
| G11B 27/11 | (2006.01) |
| H04N 1/00 | (2006.01) |
| H04N 5/85 | (2006.01) |
| H04N 9/793 | (2006.01) |

(Continued)

(52) U.S. Cl.
CPC ......... *G11B 27/11* (2013.01); *H04N 1/00392* (2013.01); *H04N 1/00424* (2013.01);
(Continued)

(58) Field of Classification Search
CPC . G11B 27/11; H04N 1/00392; H04N 1/00424
See application file for complete search history.

(56) References Cited

U.S. PATENT DOCUMENTS

| | | |
|---|---|---|
| 5,420,638 A | 5/1995 | Riglet et al. |
| 5,717,838 A | 2/1998 | LeClair |

(Continued)

FOREIGN PATENT DOCUMENTS

| | | |
|---|---|---|
| EP | 1845704 A2 | 10/2007 |
| JP | H0662385 A | 3/1994 |

(Continued)

OTHER PUBLICATIONS

Anonymous: Autodesk Lustre 2010 User Guide, Version 1; Autodesk Inc., Oct. 2009, Retrieved from the Internet: htttp://download.autodesk.com/us/systemdocs/pdf/lustre2010_user_guide.pdf, retrieved on Jun. 10, 2011, 818 pages.

*Primary Examiner* — David J Czekaj
*Assistant Examiner* — Berteau Joisil

(57) ABSTRACT

To allow a better coordination between an image creation artist such as a movie director of photography and the final viewer, via a receiving-side display and its built-in image processing, a method of adding image defining information to an input image signal (I) comprises receiving descriptive data (D) that includes at least luminance value information on the one hand, and a regime descriptor (rd) on the other hand; and encoding into an output description data signal (DDO), relatable to an output image signal (O) based upon an input image signal (I), of the descriptive data (D) in a technical format standardized to be intended for use by a receiving-side display to control its image processing for changing the color properties of its rendered images.

24 Claims, 7 Drawing Sheets

(51) Int. Cl.
*H04N 19/17* (2014.01)
*H04N 19/46* (2014.01)

(52) U.S. Cl.
CPC .......... *H04N 1/00448* (2013.01); *H04N 5/85* (2013.01); *H04N 9/793* (2013.01); *H04N 19/17* (2014.11); *H04N 19/182* (2014.11); *H04N 19/186* (2014.11); *H04N 19/46* (2014.11); *H04N 2201/3259* (2013.01)

(56) References Cited

U.S. PATENT DOCUMENTS

| | | | |
|---|---|---|---|
| 2001/0004739 A1* | 6/2001 | Sekiguchi | G06F 17/30247 |
| 2003/0001956 A1* | 1/2003 | Harshbarger, Jr. | G09G 3/006 |
| | | | 348/189 |
| 2005/0073527 A1 | 4/2005 | Beardow | |
| 2005/0104838 A1* | 5/2005 | Sasaki | G09G 3/3406 |
| | | | 345/102 |
| 2005/0117798 A1 | 6/2005 | Patton et al. | |
| 2007/0061023 A1 | 3/2007 | Hoffberg et al. | |
| 2007/0268411 A1 | 11/2007 | Rehm et al. | |

FOREIGN PATENT DOCUMENTS

| | | |
|---|---|---|
| JP | 2003216970 A | 1/2002 |
| JP | 2008515349 A | 5/2008 |
| JP | 2008259161 A | 10/2008 |
| WO | 2007023425 A2 | 3/2007 |
| WO | 2007097803 A1 | 8/2007 |
| WO | 2007113754 A1 | 10/2007 |
| WO | 2009095732 A1 | 8/2009 |

* cited by examiner

METHODS AND APPARATUSES FOR PROCESSING OR DEFINING LUMINANCE/COLOR REGIMES

CROSS REFERENCE TO RELATED APPLICATION

This application is a divisional application of co-pending U.S. patent application Ser. No. 13/577,930, filed on Aug. 9, 2012, which is the National Stage Application of PCT/IB2011/050767, filed Feb. 24, 2011, which claims the priority of EP Application No. 10155277.6, filed Mar. 3, 2010, the entire contents of which are incorporated herein by reference.

FIELD OF THE INVENTION

The invention relates to a method of adding image defining information to an input image signal, an image analysis apparatus for adding image defining information to image pixel information of an input image signal, and similarly corresponding to what this method and apparatus do at the image production side, a method of processing an input image signal to be rendered based on image defining information related to the input image signal, an apparatus for processing an input image signal to be rendered based on image defining information related to the input image signal, and for coordinating the desired rendering on the image production side and the actual rendering on the display side, and an image signal comprising luminance/color regime descriptions, which will typically be standardized, e.g. in an MPEG standardization.

BACKGROUND OF THE INVENTION

In the early days of color rendering, e.g. for television program display, the relationship between the content creation side (e.g. the camera operator), and the color rendering side (e.g. display on a television or computer display) was simple, and fixed by rigid technical principles. A so called standard CRT display was defined, which had particular phosphors, a certain gamma 2.2 tone reproduction curves (TRC), with 256 approximately visually equidistant driving steps etc. There are a number of fundamental color reproduction questions which were in this manner addressed, i.e., should a color rendering system be optimized to the (best) human viewer, and more importantly, should the color rendering capabilities and in particular the color description/communication standard) be prescribed/determined (mostly) by the color capturing (camera) side or the color rendering (display) side.

A number of approximations were introduced at the time, as the ground rules for television colorimetry for the decades to come. Taking the physical display constraints of the era of the first color television into account, the first displays and displayed signals were optimized so that they would yield an ideal picture to the viewer, given the size, brightness etc. of the CRTs available at that time (NTSC, the late 1940s early 1950s: resolution fine enough for typical viewing distance, enough driving steps to just noticeable difference (JND) to perceptually reach good, indiscriminable black starting front the white luminances at the time, etc.).

Then, given that standard display of that time, which was a small, dark CRT, the rules for the content production side were laid down for converting captured scenes in reasonably looking pictures on the display, for most scenes (similar considerations took place in the world of analog photography, in which a scene had to be rendered in an often low quality photo print, which never had a contrast above 100:1, imperfect colors, etc.). E.g., even though theoretically one would need a spectral camera to measure a real life color scene (given its variable illumination), as an approximation, if one knows on which device the color is to be displayed on, camera sensitivity curves can be determined.

Images captured with such camera sensitivity curves are then supposed to reconstruct a similarly looking picture on the display, at least emulating at the same time the illumination of the scene at the capturing side, but in practice there will be errors. In addition, these camera sensitivity curves will have negative lobes. Although one could try to reproduce these theoretically optimal curves exactly with optical filter combinations, in practice (also given that the viewer does not know which colors exactly occur in the scene) matrixing will suffice to make the colors look reasonable.

Several content creation side professionals, like the camera operator and a color, grader/corrector, have to do their magic with parametric transformations to make the finally encoded images look optimal when displayed. For example, what is usually done by a color corrector (in the video world where different video feeds are combined) is that the color corrector looks at the white points of the different inputs (one global rather severe type of colorimetric image error), and matches the white points of the different inputs by increasing slightly, for example, the blue contributions of pixels, whilst also looking at critical colors like faces. In movie material, further artistic considerations may be involved, e.g., a slightly bluish look for night scenes may be casted, which, if not already largely created by a color filter matching the film characteristics, will typically be done in post production by a color grader. Another example, which may typically involve also tweaking the tone reproduction curves, is to make the movie look more desaturated, i.e., to give it a desolate look.

It is of even higher importance to take care of the tone reproduction curve gamma behavior. One might suspect that just applying a 0.45 anti-gamma correction to encode the captured linear sensor data will suffice, but apart from that, the larger dynamic range of a typical scene always has to be mapped somehow to the [0-255] interval. Tone reproduction curve tweaking will also result in, for example, a coarser, high contrast look, darker or more prominent shadows, etc. The camera operator typically has tunable anti-gamma curves available, in which the camera operator may set knee and shoulder points, etc., so that the captured scene has a good look (typically somebody looks at the captured images on a reference monitor, which used to be a CRT and may now be an LCD). In wet photography, the same can be realized with "hardware" processing, such as printing and developing conditions to map faces onto zone VI of the Adams zone system. However, nowadays there is often a digital intermediate which is worked on. Even cinematographers that love shooting on classical film stock, nowadays have available to them a digital video auxiliary stream (which can be very useful in the trend of increased technical filming, in which a lot of the action may, for example, be in front of a green screen). So in summary, apart from taking the actual room conditions at the viewer's side to be a given to be ignored, the whole color capturing system is designed around a "calibrated ideal display", which is taken into account as a fixed given fact when the content creator creates his images.

The problem is that this was already very approximative in those days. The reasoning was like "if we do a bad job reproducing a scene on photographic paper anyway, we may relax all requirements regarding accuracy, and apply a more subjective definition of the technical mapping from scene to rendering, taking into account such principles as reasonable recognizability of the imaged scenes, consumer appreciated vivid color rendering, etc." However, this technology of image encoding (e.g., as prescribed in PAL, or MPEG2) should be understood as co-existing with a number of critical questions, like: "what if one changes the illumination of the captured scene, be it the illuminance or the white point, or the spatial distribution, or the special characteristics", "what about the errors introduced due to differences in illumination of the scene and the viewing environment, especially when seen in the light of a human viewer adapted to the scene vs. viewing environment", etc.

These problems and resulting errors became aggravated when displays started changing from the standard CRT in a standard living room, to a range of very different displays and viewing environments (e.g., the peak white luminance of displays increased). Note that, as used herein, the phrase "peak white luminance of a display" and the expressions "display white luminance" and "display peak brightness (PB_D)" are interchangeable, with similar meaning.

SUMMARY OF THE INVENTION

The technical solutions, described herein below, are inspired by an object to make image creation (in particular digital video, which may also be digitized film stock material, whether recently shot, or old material remastering) more versatile, to take into account present and future evolutions in image/video/film production, and in particular future displays (i.e., displays having different dynamic ranges, or display peak brightness (PB_D)). Whereas evolution in movie theatres was somewhat slower, a problem started occurring already that actual displays in the viewer's living room had become LCDs and changed in their display properties such as color primaries, tone reproduction, etc. The prior solution however was to stick to a rigid standard, and make the LCD behave like a standard CRT again, by using tone reproduction curve conversion lookup tables, etc.

However, with the appearance of high dynamic range (HDR) displays, such a prior solution became unfeasible: one just cannot pretend that a first display which is physically (as to black level, grey level controllability, brightness of peak white, etc.) very different from another second display "can be made to behave exactly like" that second (ideal) display. This prior solution might work if one really wanted to emulate exactly on a current high quality high dynamic range display the behavior of a low quality display of the 1950s, but that is not how people want to use their new high quality displays (why buy a high quality display if it only shows low quality output). Typically, whether done automatically by the TV's (i.e., rendering or receiving side, high quality display's) picture optimization algorithms, or manually by the viewer changing the picture viewing properties or preferences of the TV on his remote control, these televisions want to maximize their spectacular look, which may involve such things as increasing brightness and saturation of pictures. However, this may have several visual disadvantages regarding the actual look of the finally rendered pictures, e.g., incorrect darkness or black regions, cartoonization of the content by excessively increasing the saturation, staircase patterns in gradients such as the sky, due to the fact that the few available codes in the image/video signal are stretched excessively, etc.

If one understands that the above-described scenario is not just a problem of a single HDR display, but rather that the television/movie world is changing (e.g., not only do more consumers view movies on their low quality LCD laptops, but even on small portable displays like mobile phones and the like), one realizes that it may be advantageous to have a more controllable link between (i) what the actual content was supposed to look like (in particular, as determinable at the content creator side (also referred to herein as "creation side"), which has available not only the original scene, but also the artists/director of photography's intentions as to what look the scene should have (e.g., darkish, mystical, etc.)), and (ii) what it would actually look like on the receiver's side display 730 (FIG. 7), if no "correct" processing was done, or even "incorrect" display processing, which may worsen the resulting look.

In the past, one always wanted to solve this problem by using some fixed calibration chain (i.e., creating new, better values for the pixel data), a "good once and for all" solution, which may result in an "average" look which is actually really good for nobody, in particular now that displays have become so good that any artifact can become annoyingly perceivable. Another trend is that excessive parts of movies are becoming customizable (e.g., half of a science fiction movie may be generated in computer graphics, and the other half may have added special effects), which in turn preferably dictates that also, at the capturing side, more of the actual environment shot is captured (e.g., the illumination distribution as determinable with a sphere). This point is particularly interesting as a mindset: current imaging captures—even ignoring the above color encoding approximation—too little of the actual scene. Enough is captured for recognizable objects (but that would already be largely realized with binary line drawings), but not for beautifully renderable pictures (whether the criterion relates to realisticness, color impact, etc.).

Lastly, and for good reasons (e.g., retraining of highly specialized camera operators), technical standards are resistant to change. The disappearing PAL standard is not going to be updated anymore. However, new standards will emerge taking into account the changed image reproduction environment, and taking into account the standard's usefulness with a view towards the future such as ever increasing camera and display quality. For example, increased camera quality can include +/−14 bit. In addition, even plain consumers are using ever increasing quality cameras, which may, with their automatic optimization algorithms in the future, yield—apart from artistic input—better results than what the average old days camera operator was producing. Furthermore, the plain consumers may want to see their pictures of monument valley on their HDR display as if they were still there.

Accordingly, the embodiments of the present disclosure offer solutions to further improve the controllability of what an artist would like people to see, versus what would be displayed, e.g., on a home television. In other words, what an artist/creator on the creation side would like people to see, versus what would be displayed on a rendering/receiving side display having a given display quality can take several forms. The several forms can depend on the kind of artist and the artist's preferences, from (i) an "I mostly want to do nothing, letting the viewer or television manufacturer doing the controlling—view" in which, e.g., only severe modifications of the content as finally rendered by the display are forbidden, on the one side of the spectrum of control options, to (ii) on the other side of the spectrum, attempts to bring a rendering as close as possible to an ideal reproduction of what the artist intended, given the rendering side display limitations, e.g., a display white luminance of the rending side display.

Thereto, in addition to the normal pixel based coding of the image at the creation side, it is desired to have an additional metadata, indicating (i) what that pixel data actually means, and (ii) what the receiving side is supposed to do with it, e.g., regarding pre-rendering image processing. One could conceptualize normal pixel based coding of an image as "linear, one-to-one" coding, which is actually what a CCD sensor set to a certain sensitivity does. It should be understood that linear pixel coding is, although very powerful in its versatility to encode every scene, also relatively stupid (the other side of the coin), in that more can be said about the "blindly" encoded pixels. This can be done by introducing "color regimes" (also referred to herein as "luminance/color regimes", "luminance regimes", "regimes", or simply "regime"). So it is important to understand that the regime is not necessarily again a (blind) numerical representation of the actual "object-shading" in a certain region, but something additional about the scene. The something additional about the scene can depend on which different classes of things (e.g., objects, spatial regions, illumination categories, etc.) there are in the scene, or even on how an artistic person would see the real captured, or artistically improved scene, in that sense, it should be understood that all creators (i.e., whether human or automated) can use the embodiments of the present disclosure. Creators can include, for example, both a camera man (i.e., actually annotating properties of the, at that moment, captured scene), and a later post processor e.g., a color grader and/or re-grading processor that artistically reinterprets the captured scene).

The above-mentioned concepts are more easily grasped if explained with a few illustrative examples. Even if one always will have examples that the actual pixel coding (especially when in [0,255] hut even possibly in HDR encodings) may involve pixel values that do not accurately reflect the underlying scene object and its color characteristics, one may desire to denote the object or region of pixels as a certain "type" of image information, to which a certain display side rendering action should correspond. Note, as used herein, the term "color" is used loosely as also including luminance/lightness only. In addition, pixel values that do not accurately reflect the underlying scene object and its color characteristics can be better understood in the following. The value 255 white may represent, for example, a white wall in a somewhat darker region of the picture, as well as light reflections on an eye, as well as the interior of very bright light, or even a clipped blue sky.

Consider the following example. According to a new codification as desired by a content creator, a certain dark region should be so displayed that before a certain time moment a horror monster is (nearly) hidden in the dark, but after a certain time moment it becomes visible to a certain degree, corresponding to a regime that may be denoted as "dark_hidden" The content creator can also more precisely specify how much of a person hidden in the dark emerges, e.g., 25% of the hidden person's body, or even more specifically, the part of the hidden person's face. One can imagine if doing this blindly, more or less than desired by the content creator may actually be visible on the rendering side, e.g., due to backlight boosting, light reflecting from the display face plate, etc. Only when knowing by co-encoding what was intended (i.e., per the new codification as desired by the content creator as in the present example), the rendering side can—knowing all its rendering side local limitations—take care of actually achieving or approximating the intended rendering (which cannot be done when simply having pixel encoding, or something similar). Another example is that if one knows which colors are typically average lightness reflected colors as encoded in the scene, one could render them so that they are of coordinated luminance as the actual average lightness reflection colors in the viewer's living room surroundings.

One aspect of the embodiments of the present disclosure can be realized by having a method of adding image defining information to an input image signal (I), comprising:
  showing the input image (I) to a human operator;
  receiving via a user interface (303, 308) descriptive data (D) from the human operator, the descriptive data (D) including at least luminance values and/or geometrical shape information on the one hand, and a regime descriptor (rd) on the other hand;
  encoding into an output description data signal (DDO), relatable to an output image signal (O) based upon the input image signal (I), the descriptive data (D) in a technical format standardized to be intended for use by a receiving display to control its image processing for changing the color properties of its rendered images, and by corresponding apparatuses at the image creation side, and corresponding methods and apparatuses at the display side, and in particular, several possible coordination signals to describe the regimes, and what the display side system should do to approximate the intended, desirable final rendering (e.g., which may be an "as close as possible" approximation of the original scene, but taking the local viewing site environment into account, such as white point of the room lights, etc.).

In another example, a color grader can with the directions of the director, look at the scene, and identify a part of a commercial lightbox on a wall (e.g., which may be specified (i) as an approximate location and color values, or (ii) by drawing a rough ellipse on it, and further segmenting), and designate not only that this is a special region, but now also encode this as what special region, namely, what rendering regime should be applied. For example, the applied rendering regime could be a regime to make "flaming eyes" (rd) on a person in the lightbox, and coordinate the surround light, as would look best given the specifics of the rendering display. The color grader may then process the input image in an encoded output image O, which according to the above philosophy would be kind of an average look. In other words, one can compare it with a latitude leading to nice recognizability of most objects in a captured picture, but then with the additional description data specifying the regimes, one can transform this average encoding in much better looking pictures in all different viewing sites. Image processing algorithms on the display rendering side may then apply tone mappings, or other image processing operations especially to modify the look of local regions, to specific regions, according to the regime descriptions.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concept, and in which dashes are used to indicate that a component is optional, non-dashed components not necessarily being essential. Dashes can also be used for indicating that elements, which are explained to be essential, are hidden in the interior of an object, or for intangible things such as, e.g., selections of objects/regions (and how they may be shown on a display).

In the drawings.

DETAILED DESCRIPTION

Figure 1:
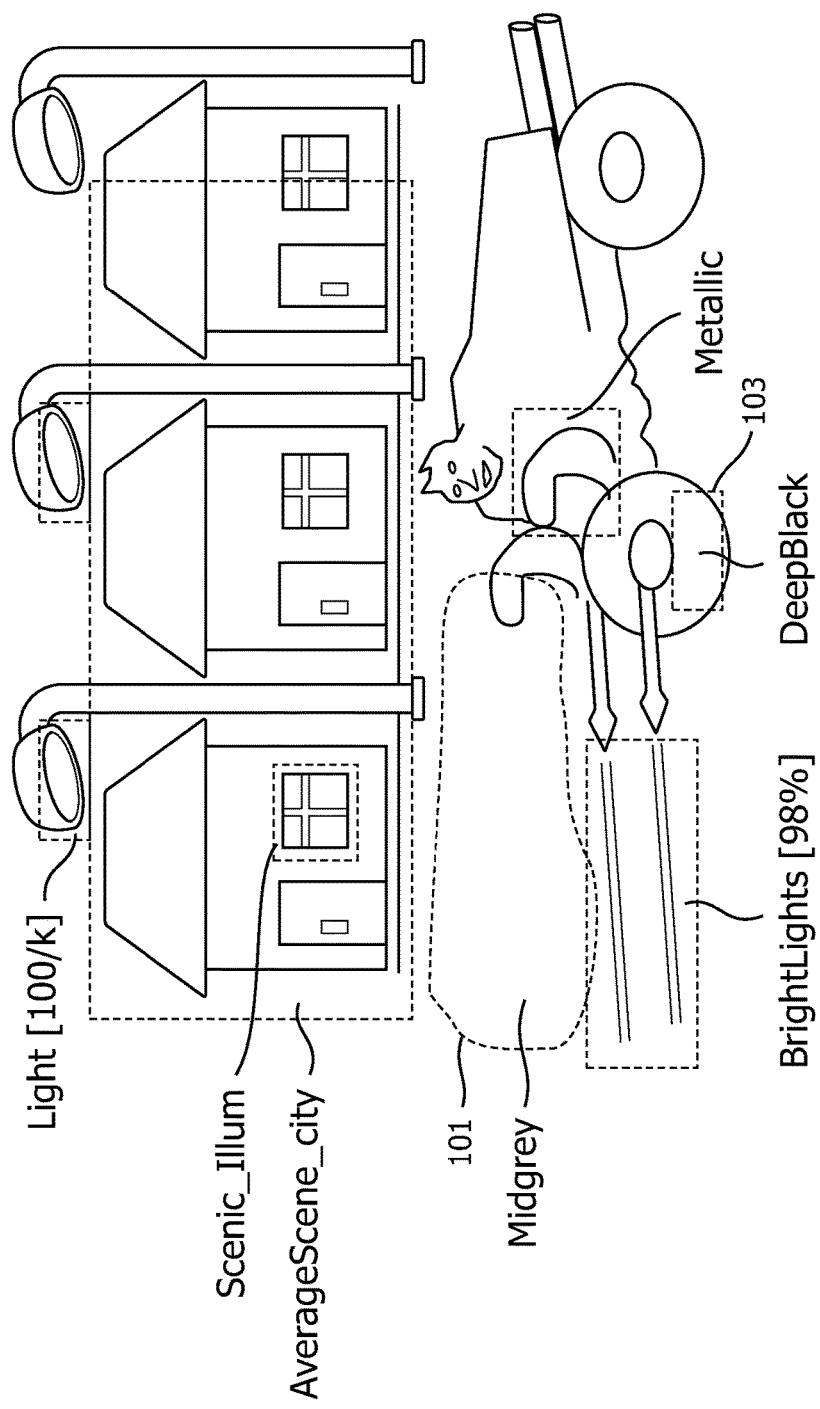
FIG. 1 schematically illustrates a few of the typical regimes which would be desirable and achievable using the principles of our invention on an exemplary movie scene.

FIG. 1 shows an example of a batman movie, and some effects which can be realized on a HDR display with the current invention. At this moment, HDR displays can use whatever their internal processing is to "optimize" the image, which is however oftentimes so geared towards light output maximization (or saturation boost). So, the picture may not be shown optimally at all, perhaps even rendered in an ugly, unrealistic way (e.g., fluorescent bananas), at least not what the artist/creator would have originally intended. Typically, the boosts—even when parametrically, and dependent on image properties such as histograms—are of a "stretch-all" type boosting all pixels similarly. However, a disadvantage of such a "stretch-all" type boosting can be understood when, for example, boosting some road lights, one may not simply want the grey road around it to become increasingly bright similarly. In contrast, a more realistic rendering may depend on the distribution of color values on the road—or even its spatial/property analysis, like texture—and make water droplets on the road increasingly bright together with the lights in the image, but not so much the diffusely reflecting parts of the road. Or, in a computer game showing a dark basement, one may indeed want to boost the power of some lights, but do something entirely different to shadow regions, dark grey pillars, etc. In fact, the optimal processing of the regions may be so nonlinear that no global processing, or not even any function derived solely on the display/receiver side, will do a good job. To get out of this conundrum, the creating artist can specify "color regimes" (also referred to herein as "luminance/color regimes", "luminance regimes", "regimes", or simply "regime"), which may be few and simple, or many with complex details, but allowing the artist/creator to have a say as to what can, will, or alternatively must not happen to the final look (i.e., implying typically the processing applied by the display on the received input signals for the pixels in its different regions).

In a simple variant, the artist/creator will annotate regions of the image histogram (i.e., often of spatial subregions of a picture, but they may also only be, e.g., luminance, or color values for a shot of successive pictures), and give them a code or descriptor indicating which regime they belong to. In one embodiment, the code or descriptor may be a simple indication of what these regions mean. Although complex descriptors of the multimodal spatial-histogram distributions in a region may be employed, we will explain herein a simpler case in which the artist/creator only gives a luminance range for the region.

To begin with, there is typically a range of luminances (or colors) in the coded image (which will be transmitted to the receiving end, whether via a television cable, a memory device such as a blu-ray disk, etc., and serve there as input image, i.e., note that the output image O of the creation side is typically the input image on the receiving side), which will be, for example, between the minimum and maximum luminance in a region 101 (e.g., an arbitrarily shaped region) selected by the artist/creator on this input image. Corresponding to the input luminance interval in the picture, on the reproduction side there will also be at least one output luminance interval, e.g. as rendered outgoing light of the rendering side display, or an image processing modified driving image for the LCD pixels. For example, the minimum luminance may have an offset added, and the luminance range may be stretched by a multiplicative factor 2.

However, in a preferred embodiment, the reproduction scenario may be more complex. In one example, for a bimodal histogram—because region 101 contains mainly two "kinds" of objects, the somewhat darker ones, and the normal luminance ones—one may want to prescribe nonlinear mapping functions which keep a relationship between the average luminances of the subhistograms, so that their ratio doesn't become visually unrealistic. In fact, luminance range mapping has usually been considered as a problem of cramming all the input range pixels in the output range, usually with the technical limitation of clipping (or similarly, not taking care of visibility constraints for the dark values, making the dark values effectively invisible to the viewer because the dark values fall below screen reflections), which is done by one of many heuristic smart tone mapping algorithms. However, if one has a (factual or artistic as regards to what the pixels encode) "meaning" for all the subregions of the histogram corresponding to objects, one can make a much smarter allocation of the optimal output luminances to pixel regions, not only to give the entire image a balanced look, but more as a (parametric) coordinated hierarchy of smartly superimposed object-related ranges, even with optimal positioning of the pixel region color values within a single selected object with a particular meaning. For example, one can imagine that one may want to coordinate the rendering and, in particular, the luminance range allocation of first pixels corresponding to a light inside a shop, with other pixels visible through the shop window on the one hand, and lights outside the shop on the other hand, knowing that such coordination relationships will tune the visual impact.

With reference still to FIG. 1, the region 101 determines (preferably all, although it may also function as a color/texture property region for teaching the receiver how it can segment all similar regions) pixels to be coded as "Midgrey", which in this case is a plain grey road. Note that the text of the present disclosure often refers of the receiving display 730 (FIG. 7) as doing the rendering processing; however, the skilled person will know that other apparatuses such as a blu-ray disk reader, a set-top-box (STB), a personal computer, or mobile apparatus, etc., may do all or some of the signal processing, yielding the final image (IR) (FIG. 7) to be displayed at the rendering side. Since the receiving display or television may still do its own additional processing, a distinction is made between the output signal IR' of a receiving side luminance processing apparatus, e.g., the blu-ray player, and the output signal IR finally displayed on the rendering side monitor, tv, projector, etc., as will become clearer from the discussion herein below. Communication between the two devices (e.g., the receiving side luminance processing apparatus and the rendering side display) for communicating their image-related physical properties, and measured viewing environment properties may preferably be available.

Not only has coding the Midgrey region 101 as being of a particular type provided the advantage that it can be optimally rendered, but also coding of the Midgrey region 101 as being of the particular type can aid all scene analysis/understanding algorithms at the receiving side. Optimally rendered can be understood plainly as being, i.e., of not too high luminance—e.g., related to an average grey luminance in the viewer's room—and having a low saturation, which may involve putting a limit on the boosting algorithm parameters of the rendering side display. Or, optimally rendered can be understood to even invoke a desaturation operation. That is, instead of giving the movie a paler look for all scenarios, invoking an optimally rendered desaturation operation can in this way be done, tuned per display/viewer, i.e., at least partly, taking into account the viewer's visual accommodation state, etc.

Furthermore, it has always been a daunting task to separate the scene illumination from the scene object reflectances, and selection of this grey area (Midgrey region 101) can help (i.e., it can be seen as the equivalent of an a posteriori McBeth checker), and in particular, if the selection is co-stored in the output image signal from the capturing side with light properties measured in scene. Light properties measured in scene can include, for example, the actual luminance of parts of the scene corresponding, after projection, with captured image locations falling in the selected region, color cast imbalances (perhaps even measured with a simple spectrometer), etc. The quantification of what the grey was like in the original scene and/or what it should preferably look like in the final rendering, can then be used to, e.g., more optimally render the other colors, or change ambient light (which may be of the ambilight type directly surrounding the display, or light speakers creating illuminations in several locations of the room in synchrony with the displayed images), etc.

Other important types are the difficult components of dark color regimes (which have up to now been largely ignored). They may be present (and should behave differently, i.e. lead to different display processing and rendering) either in normal light scenarios like in FIG. 1 (e.g., the black motorcycle tires and batman's cape, but under normal illumination), or in dark scenes (e.g., like horror movies, in which the entire scene is optimally processed to give an overall darkish look, emphasizing mostly on the property of visibility, as will be explained in connection with a corridor example below, and preferably coordinating with the room illumination, such as lowering the light speakers, and co-driving the light speakers with the picture content).

In the example of a dark regime that will now be discussed, for the artist's convenience and to keep the color grading expenses low, a single regime code for the dark regime is used, namely "DeepBlack". Depending on the properties of the rendering side display (and preferably also the measured viewing environment, see below), the display will be controlled to process this in a balanced way, so that, on the one hand, the region looks very dark, but on the other hand, where possible it still shows texture. For a high end HDR display in a cinematically lighted living room, this will result in a different processing (namely mapping on a dark region of luminances, in which there are still a number of actually visible just noticeable differences (JNDs) present) than on a typical television and living room as at present, or even an outdoors mobile display (which will just clip the entire region to minimum black, on that at least some darkness intent is suggested).

If one starts "stretching" luminances or colors to at least very bright, and perhaps nicely dark, it is important to have some reference (or at least regions which are not changed too much). Thereto, the artist may use "AverageScene" codes, of which the artist may use a single default one (to which the rendering display reacts as if it was, e.g., an Adams V value, which may be mapped on the display around what is 18% of typical low dynamic range, maximum white luminance being equal to 500 nit; or equal to a multiplicative factor times the average luminance of the viewing surround, etc.). In addition, the artist may use several variants of the "AverageScene" code so that a complex allocation can be done of darker greys, versus brighter greys more conforming to the brighter white display, etc. Having available the several variants of "AverageScene" code, a HDR display may then use these several greys, whereas a lesser quality display (e.g., a low dynamic range (LDR) display) may render as if there was only one grey reference.

In FIG. 1, the "AverageScene_city" code is used, in which the artist may incorporate actual knowledge of typical cities (e.g., typical cites are composed of bricks of a certain reflectance), or his rendering intent (e.g., the houses may have bright paint on them, and the color grader may want to specify that this is rendered on the display with an output luminance between $L_{min}$ and $L_{max}$ and a saturation between $S_{min}$ and $S_{max}$). Note that although the artist may want the houses to look bright indeed, they are still part of the background. Although beautifying the movie, the houses which are part of the background are not the predominant objects. Accordingly, the houses should also not become too predominant as to their rendered colors (e.g., luminances), which the artist can control by specifying that whatever algorithm the rendering side display may want to use, the rendered colors (e.g., luminances should not go above the maximum ($L_{max}$, $S_{max}$).

Of course more complicated rendering specifications can be given, in which the artist can specify values like "optimally approximate to give the average of the region a value $LA_{opt}$ and the maximum pixel $LM_{opt}$", "in case of boost, try to stay below or around an intended average luminance for the region $LA_{int}$", "in any case stay below a forbidden average luminance $LA_{forb}$", etc. This allows more freedom regarding the display manufacturer's color processing. In advanced systems, the artist may even want to prescribe exactly what processing a particular rendering side display performs, e.g., to enable the "intended rendering" mode. In general, however, the rendering side displays will do their own processing, which may be quite simple and not allow much tuning. The artist may further specify a value like "try to stay around the intended maximum luminance/color $LM_{int}$," that can then suffice for both sides, creator and display manufacturer, and then the rendering side display can, for example, predicatively or iteratively measure whether its rendering has given the region a sufficiently close luminance/color.

Important in HDR, with respect to displaying images, are also the brighter regions. In particular, it is important that the brighter regions can be coordinated relatively to other regions (i.e., so that not everything looks brightened to the some degree). To accomplish the brighter region coordination relative to other regions, one has available the right regime codes to discriminate the brighter regions relative to other regions. As a guideline for discriminating, the artist may use such properties as local chroma, duration in time of the display of the region (e.g., to create a special bright flash effect, when the region is a fireball, etc.). A region may have a first regime code for a first time instant or time span, and a second regime code for a second, e.g. "fireball" versus "extinguishing fireball".

In the FIG. 1 example, a discrimination is made specifying the "BrightLights" code, which can be used for batman's laser rays, and which has as additional parameters indicating that the artist/creator's intention is that the display renders the laser rays at around 98% of the maximum achievable brightness (i.e., for that blue color). The street-lights that are always on in the shot, and should not give such a distracting spicy effect (note that in a real scene the viewer may look around them differently than on a small diagonal display, the diagonal being a factor which the rendering side display may use to determine the street lights' final luminance, if desired also under control of the artist), so the street-lights will be given another regime code "Light". The regime code "Light" will be rendered at a luminance being the maximum achievable luminance divided by a certain factor, e.g., k=4. Depending on how bright the rendering side display can be, one wants to reserve more or less luminance dynamic range for the reflecting scene object pixels versus, far offset from those, the light source pixels representative of the street-lights.

Another light code (i.e., regime code) can be used for light pixel regions which give a scenic illumination, e.g., corresponding to the light shining through the window in a wintery scene. The artist may want to give only some of the illuminated windows a "Scenic_Illum" code, e.g., corresponding to those having an eery bluish light instead of the normal warm incandescent. These regime codes can then be re-used, e.g., to drive the ambient lighting, which is now coordinated not with a heuristic average of what's happening in the scene, but with a real light in the scene. An ambient illumination calculator may use as input only the warm incandescent regions. In addition, the regime specification may be re-used, e.g., according to the patterned ambilight projection invention of WO2007/113754, by creating a spot of the window light color (and if possible also geometric distribution), and continuing to move it outside of the rendering display with the speed of the video. Even though the lights may not actually be exactly what's in the video being rendered, if the artist selects a typical room window, this will be sufficient for ambient environment simulation. Also the "Brighlights" regimes can be used to flash, e.g., alight speaker which is 90 degrees sideways of the viewer, to simulate reflections on the viewer's living room walls, etc.

Lastly an example has been provided and shown to elucidate that the regime encodings are not purely intended to parameterize multiplicative-type mappings (like offsetting and scaling a range of colors), but that more complex spatial profile control may be desirable, and compatible with what nowadays color graders desire.

Figure 2:
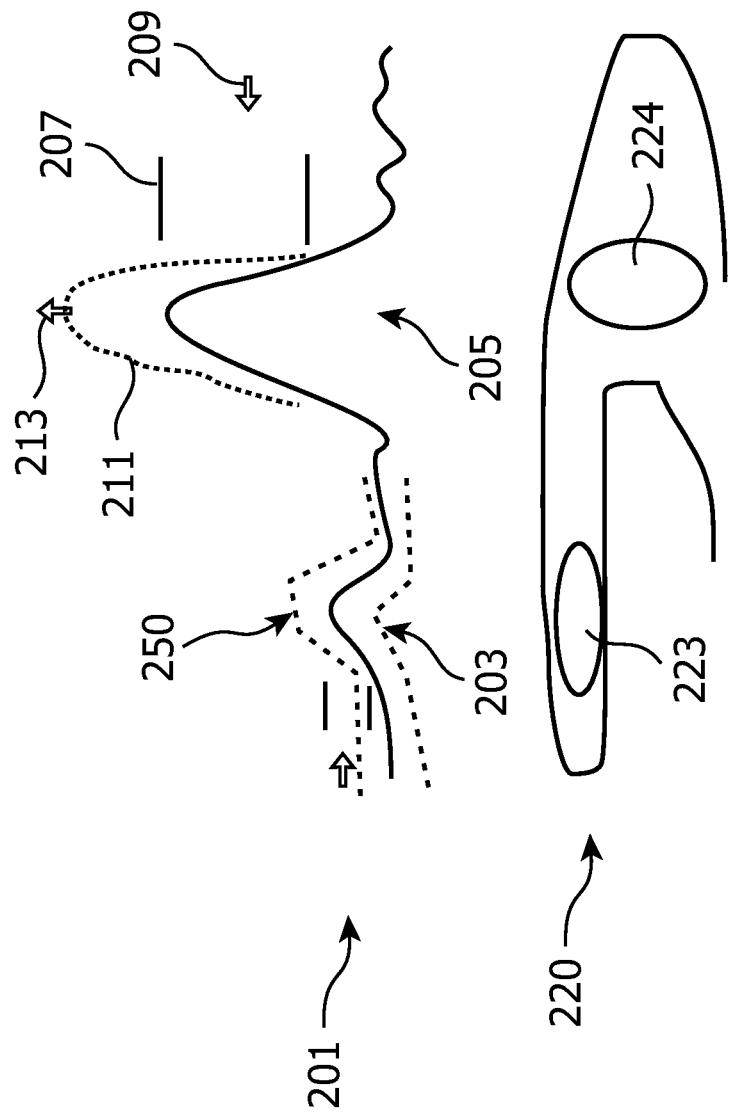
FIG. 2 schematically illustrates how one can specify a complex geometrical profile with several light reflection regions which need to be coordinated (e.g., with each other and with other regions of an image)

The metallic parts of the motorcycle handles are given the code "Metallic" to indicate that the metallic parts behave very differently in an actual environment than Lambertian diffusing objects which are relatively easy, and because especially, parametric modification may introduce artefacts, the metallic parts preferably have to be treated in a different way, which is elucidated with FIG. 2.

FIG. 2 schematically shows what would be seen on a screen of a color grader device/apparatus running a software tool for improving the captured video and doing color regime specification, and how a color grader can specify more complex color rendering behavior for the metallic handles of batman's bike. View 201 shows a cross-section luminance profile for pixels of one metallic handle, and that the metallic handle (which is shown geometrically as sub-picture in view 220) mainly reflects average surround (which will not be so critical) but also specularly one of the light post lights leading to profile bump 205 (corresponding with a specular patch of pixels 224), and the blue laser flashes leading to bump 203 (corresponding with a specular patch of pixels 223). It would be strange if the profile is updated coordinating with the entire scene, which likely will coordinate with the light post light, but that the other specular highlight stays dull, although a laser fires nearby.

Preferably, to be able to artistically optimally coordinate the specular objects with different renderings of the display scene (e.g., the user increasing the brightness, an apparatus is provided to the color grader (e.g., a software module and/or other suitable apparatus) which is arranged to create and modify luminance (and possibly full color, including chromaticity) profiles of pixel regions. This can be done e.g. by modeling a part of a profile (either explicitly as adjacent pixel values, or by fitting parametric functions like, e.g., multi-Gaussian decomposition) and allowing the color grader to tune this, e.g. change the amplitude of the luminance profile bump. An example of software behavior is that the color grader can indicate a range 207 over which the luminance bump is visually predominant and needs changing, which range can be drawn with selection cursor 209. The color grader can then scale the original bump profile to a new stretched luminance bump profile 211, for example, in steps, by clicking on selection cursor 213, so that the new look is in tune with a changed global, or highlight, or scene light brightness. The color grader can look at the corresponding effects on a high quality HDR display, and toggle the display into several emulation modes for lower quality displays.

Different options are also available, or possible. Either a tunable function (which will typically at least have, as a tuning parameter, the average luminance of one of the light post light areas) can be stored in the video signal (e.g., as metadata) to be outputted for use (e.g., on a Blu-ray disk), and the rendering side display mandatorily uses this function as color processing for the metallic region (e.g., as a function of the viewer's brightness preferences etc.), or one or more reference models (e.g., resultant pixel luminance profiles)

are stored for the rendering side display to use as guidance (i.e., for display tuning) when applying its proprietary color algorithms.

In another example, spatio (temporal) luminance profiles for three kinds of rendering displays (HDR, LDR and dynamic range other than that HDR or LDR) and 4 lightness levels for the high end (HDR) display can be encoded as starting point, and the HDR display may copy the highest brightness (mostly stretched bump) luminance profile as starting signal, upon which the HDR display may then employ a limited amount of further processing. Although this is not a 100% accurate rendering of the metallic region, the benefit of being controllable yields better results (i.e., improved luminance mapping results) than doing things blindly (i.e., without the display tuning as disclosed by the embodiments of the present disclosure). Alternatively, for a parametric encoding of all the illumination effects on the metallic handle, the rendering side display may calculate an optimal luminance bump shape for its viewing environment (e.g., display characteristics, surround, etc.).

Another example, of the need for and/or allowing of the methods/apparatuses according to the embodiments of the present disclosure of spatial color rendering control (e.g., display tuning), is that of reflections surrounding a light, e.g., on a brick wall. Typically in uncontrolled low dynamic range (LDR) systems, the reflections surrounding the light on the brick wall will map somewhere to a valid code in [0,255] (e.g., sometimes 255), and then post-processing used to generate high dynamic range (HDR) in the display may not recognize them (i.e., the reflections) as specific regions (potentially even with overexposure) and scale them (i.e., the reflections) like the rest of the average background, instead of co-scaling them (i.e., the reflections) with the increased brightness rendering of the light. This co-scaling can be achieved by either allowing a spatial sub-profile rendering intent specification in the "Light" profile itself (e.g., co-map with the average brightness of the lamp, and a reflection parameter such as an albedo, or apply a parameterized function like an exponential downfall), or an additional profile may be created, namely "Light_Reflection", the properties of which are co-tuned with those of the "Light" profile. For example, the system may be configured to propose a rendering for the reflection profile to the artist/color, grader, which the artist/color grader may then easily fine-tune with control parameters.

Note that the examples disclosed herein are purely illustrative to describe what kinds of control between artist/capturing side and display processing and rendering are desirable, and many more variants can be included and/or are possible. In a simple system, one or more frequently usable scenarios can be fixed and/or encoded in an image property communication standard (i.e., knowing exactly what would happen for each scenario), but of course, the image property communication standard may be upgradeable, in that the artist/color grader codifies a new class. In codifying a new class, the artist/color grader also specifies its colorimetric properties, which may include one or more of texture properties, amount of modification which may be applied, and if desired even particular types of processing algorithms, parameters, equations, etc. (e.g., a saturation algorithm, a derivative-based local brightness stretch, or other image processing algorithms like an upscaling which also leads to different visual colorfulness, noise processing, etc.). In addition, regimes descriptions may be supplemented with all kinds of further information regarding how to render, process, modify, improve, encode, etc. the various pixel regions and/or corresponding luminance profiles.

Other examples of interesting regime codes include, e.g., "Pastel" and "CommercialBoost". It has been found that often excessive saturations boosts in rendering side displays make pastels disappear. For example, sunsets may look unnatural. However, the "Pastel" regime code can enforce the pastels to stay pastel in their final rendering. With respect to the regime code "CommercialBoost", the regime allows, for example, during commercials, to boost or, even depending on the display, differently render certain objects. In other words, a multi-primary display which is able to create highly saturated oranges may color an initially more yellowish object into bright orange.

Figure 3:
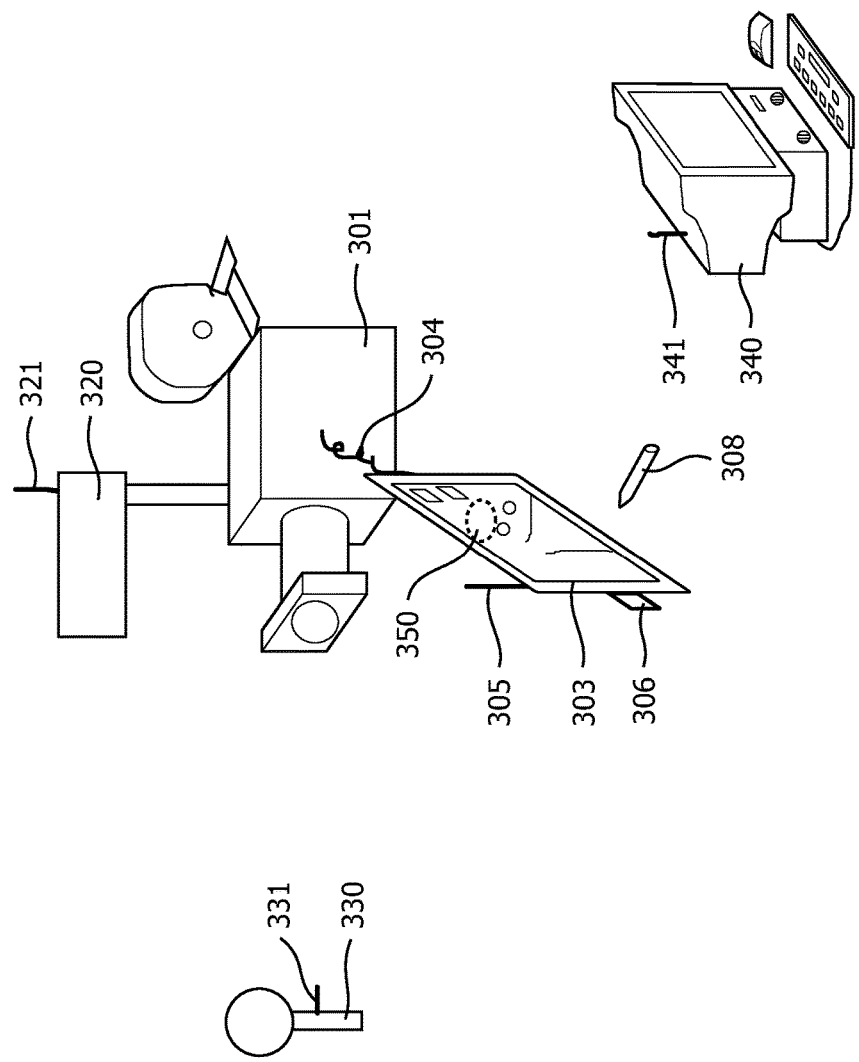
FIG. 3 schematically illustrates an environment and its apparatuses allowing an image/movie creator to add luminance/color regimes to a captured scene image.

FIG. 3 schematically shows some of the apparatuses present at the creation (transmission) side useful for creating a good color regime description signal, according to an embodiment of the present disclosure. A scenario is disclosed herein where the apparatuses are integrated with a classical celluloid film camera 301. Note that the digital assisting representation of the scene will only fully (i.e., as to the pixel values of the analog vs. digital recordings) be linkable to the actually captured celluloid picture if movie material calibration models are incorporated for mapping the two. However, the development is then still an unknown variable that can be supplementary played with. Even without those, the digital recording can still yield very valuable side information. For example, if the digital recording is geometrically co-registered with the celluloid captured view window, one can define regions, and apart from the celluloid captured developed grain values, one can code linear actual scene view values via the digital capturing. The skilled person will understand how to transpose these components to (i) a fully digital capturing embodiment in the room of a color grader, or (ii) a transcoder doing the same, for creating a regime description signal of a captured analog or digital recording, for example, an old Laurel and Hardy picture.

As shown in FIG. 3, in one embodiment, a digital display 303 is attached to the camera 301, which gets a feed, via connection 304, from a camera lens co-registered CCD (not shown). The connection 304 need not be fixed, but can also be a transmitter for a number of separate displays (e.g., one for the camera operator, and one in the overview stack of the director). Upon a corresponding display, the camera operator or director of photography can draw a region 350, for example, which they know they have calibrated with their stage lighting as a dark part of the image. Drawing the region 350 on the display can be accomplished with the use of a light pen 308, or other suitable user interface input means. While only one example of user input, via light pen 308, has been described, the skilled person can well understand that other types of system user interface input can also be used to allow a user to give feedback on a displayed image.

With reference still to FIG. 3, the display 303 may store added information (e.g., regime specifications) onto a memory 306 (e.g., a detachable memory stick), or communicate the added information via a transmission system 305. The display 303 can also receive further information from an in-filming-situ scene analysis device 320 (which may simply be a light meter or even a spatially sampling spectrometer), via its transmission system 321, which may also transmit to the final data accumulation place (i.e. computer or data accumulation apparatus 340). Furthermore, in-scene meters 330 (e.g., local illumination meters configured to measure, for example, how actor's faces where illuminated, especially when with highly variable lighting; sphere systems looking at the surrounding illumination distribution; etc.) may transmit their data to any part of the system via their transmission system 331. The receiving display can then try to reproduce the light in its original brightness, or at least a fraction (or function) thereof, typically in accordance with some psychovisual model for creating a similar look, further for coordinating the looks of the different regimes and different colors in the image. In addition, all data is accumulated on a data accumulation apparatus 340 with on-board memory, typically a computer, for example, via transmission system 341.

In another embodiment, not all components as shown in FIG. 3 need be present. That is, a simple digital duplicate, can be provided on display 303, which may be all that is desired by the director and/or color grader to make some simple annotations for only a few regime codes. However, as the skilled person understands, the system of FIG. 3 can be expanded with apparatuses to analyze the entire environment in detail (e.g., color values, light properties such as direction or spectrum, object bidirectional reflections functions or textures, etc.). An analysis of the environment in detail the system of FIG. 3 is not only useful for contemporary computer graphics effects insertion, but also useful for both the final living room display rendering (i.e., via the rendering side display) and ambient lighting which will advantageously benefit if more details of the scene as to both (i) its reflecting or in general light-interacting objects and (ii) the actual illumination are co-recorded with the final image signal. As a result, this allows better re-lighting to become more in-tune with the viewer's environment.

Figure 4:
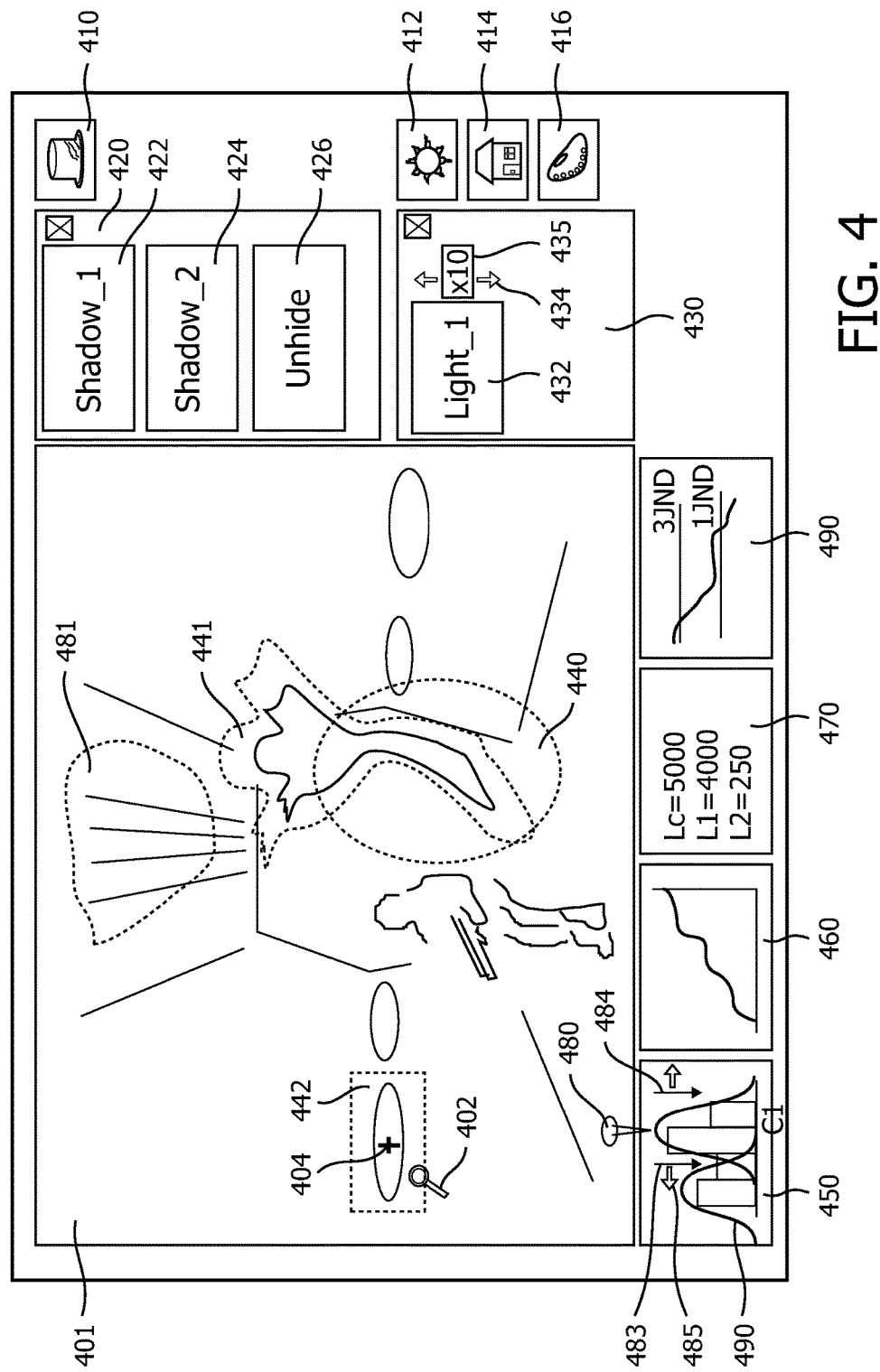
FIG. 4 schematically illustrates a user interface display of what the artistic color specialist at the creation side may see, as to the composition of the captured images, and the regimes which can be identified in them, and transformations which may be applied to them, and some schematic examples of widgets that can be used to easily interact with data corresponding to the captured images, regimes, and transformations, and create at least one regime description.

With reference now to FIG. 4, an example of what a regime annotation apparatus or software implementation) according to another embodiment of the present disclosure, is illustrated. The regime annotation apparatus (or software) is arranged to show to a color grader, or a director of photography, various information received via its wirelessly communicated feed from any camera, and allow the color grader and/or director to annotate, and to store annotations into an outputted image signal as metadata. Shown in a picture viewing area 401 of FIG. 4 is a corridor with a photographed soldier, and a monster (which may be a simplified rendering of a computer graphics element to be added later, subsequent to the photographed soldier).

On the right-hand side of FIG. 4 are a number of regime cluster buttons for enabling the color grader and/or director to quickly select useful regimes, e.g. a "DarkRegimes" button or icon 410, a "BrightRegimes" button or icon 412, a "AverageSceneRegimes" button or icon 414, and a "CriticalColorRegimes" button or icon 416. While the illustrated embodiment in FIG. 4 shows only a few regime selection buttons/icons, there may however be more, since the illustration is merely a conceptual illustration for elucidating the invention concepts and claims. In one embodiment, responsive to the color grader and/or the director clicking on or selecting one of the regime cluster buttons, a hierarchical menu pops up showing further buttons (e.g., "Shadow_1Regime button" 422, "Shadow_2Regime" button 424, "UnhideRegime" button 426) with selectable regimes for that cluster.

In addition, as is illustrated in FIG. 4 for the "DarkRegimes" cluster, the operator has identified a region 440 which the operator wants to be "Shadow_1". In this example, the regime descriptor (rd) of the descriptive data (D) is "Shadow_1" and this regime code, or another codification derived from it, will be added in a resulting description data signal (DDO) as output). The operator may also proceed to specify some characteristic rendering and possibly further identification properties for region 440. In another scenario, only the regime itself is specified, i.e., whether as a set of luminances or as a region of pixels, and thereby the rendering side display automatically processes, in response to the specified regime, what to do with shadows, e.g. render them as dark as possible, without needing any further specifying luminance or color properties, so that a receiving side apparatus will know how to preferably handle a subset of pixels (e.g., pixels of region 440), image processing/rendering-wise.

As indicated herein above, the regime descriptor (rd) of the descriptive data (D) and/or the regime code, or another codification derived from it, is added to a description data signal (DDO). Based upon the description data signal (DDO), the receiving display will know how to preferably handle, image processing/rendering-wise, at least one subset of pixels (e.g., at least the pixels of region 440). For example, a regime specification may specify that no pixel in that region (i.e., region 440) should be shown brighter than $L_{max}$ on a rendering display, whether in the viewer's living room, or in a cinema theatre—the latter $L_{max}$ being recalibratable on a single reference encoded number in the description data signal (DDO) which will be further transformed to an in-situ usable value. In one example, an in-situ usable value of 100 Cd/m$^2$ (or 100 nit) may be changed into an actual cinema measured value, and similar for other values. In another embodiment, an actual exact number for the value $L_{max}$ is encoded per theatre or viewing room type.

In a further embodiment, there may be several specifications to define dark regimes, and their final rendering. For example, one regime specification can take into account the position of the histogram of the dark pixels, and make sure that an upper part gets a certain position, e.g., compared to the rendered luminance of mean grey pixels in the image. Whereas, on the other hand, not too many pixels are badly visible due to the glare of front screen reflections etc., so some tone mapping may be involved, e.g., posterizing the dark region.

Figure 5:
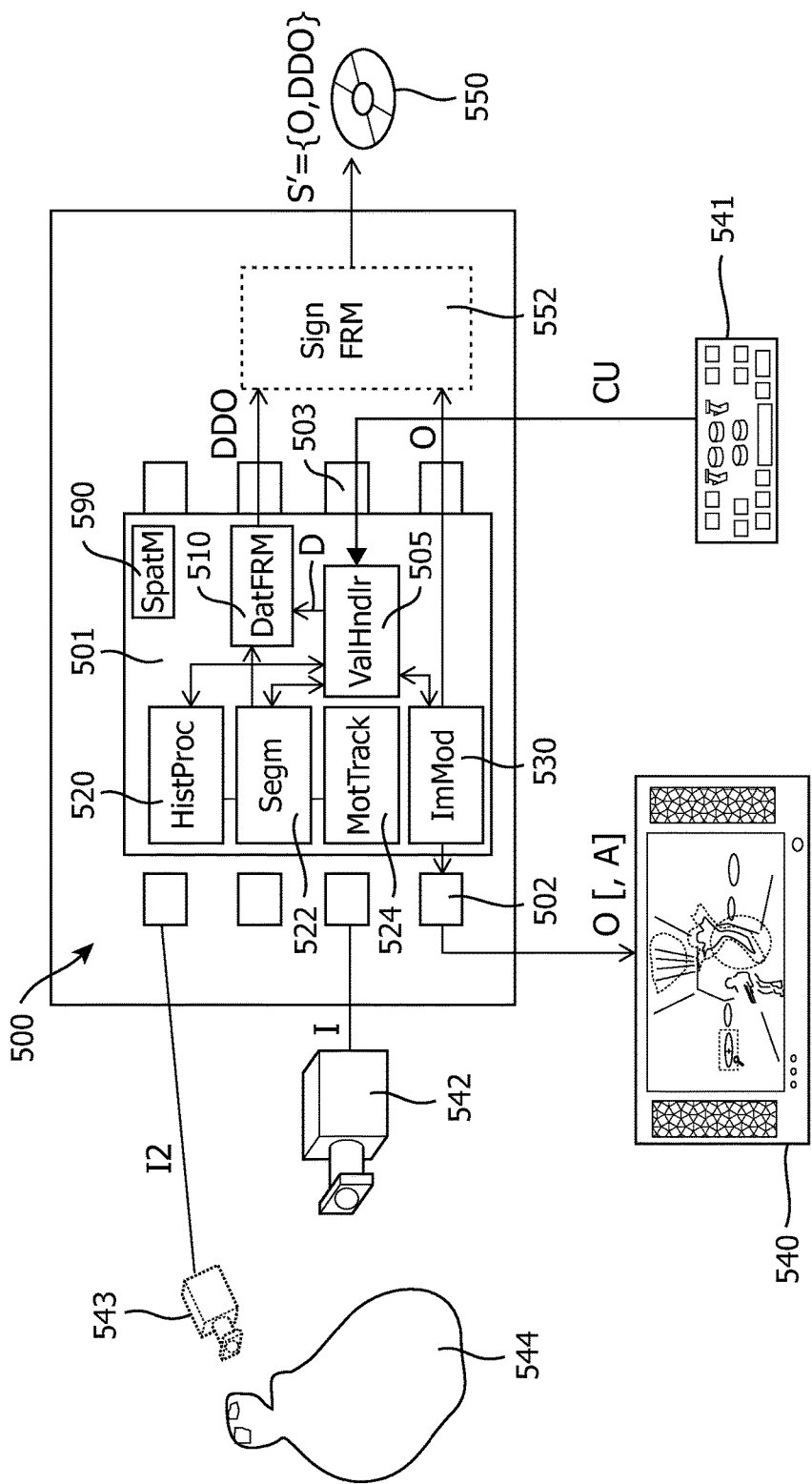
FIG. 5 schematically illustrates another environment with apparatuses and subunits allowing (i) the creation and (ii) inspection of regimes and regime specifications.

In another embodiment, the system for specifying regimes will typically have modes allowing for minimal user interaction (as the artists' time is expensive), and automatic image analysis algorithms can aid in finetuning (see FIG. 5). Using the system for specifying regimes, the color grader or user can very precisely delineate a spatial region on the picture which the color grader wants to treat, e.g. by moving the electronic pen 308 (FIG. 3), on an exact border of where the shadowy region may be drawn, but also a rough indication may be given like an ellipse or a rectangle 442 (FIG. 4). Because the greatest degree of control to specify regimes for selected objects or regions is offered if the user can both work on color/luminance properties (typically histograms) and image regions, there are additional information panels (450, 460, 470) as shown in FIG. 4. The additional information panels (450, 460, 470) do not merely display image information, but are widgets in which further selection can be realized by the user.

While the regime annotation apparatus (or software implementation) of FIG. 4 has been discussed herein with reference to regime cluster buttons, regime buttons, multipliers, and additional information panels for regime specification, it should be noted that for the many variants of annotation apparatuses/software, several or fewer of these components may be present to realize the job. For example, variants can include one or more of only setting luminance ranges, or only drawing spatial regions, etc.

In yet another example, in response to the color grader selecting a region 442 for highlight regime specification around a capture light in the image, the regime annotation apparatus (or software implementation) causes a histogram display panel 450 to output and/or show a bimodal histogram. The bimodal histogram in the histogram display panel 450 contains the bright pixels of the light and the darker pixels of the dark surrounding wall. Advanced regime annotation systems will model functions 490 based on this (i.e., the bimodal histogram), and allow the color grader to analyze, select and/or modify the selected regions and their pixel content on the basis of this complex information.

On the other hand, for simpler regime annotation systems, the color grader can use cursors 485 to select ranges (483, 484) of luminances. However, the simpler regime annotation system may still have the various models present because the models aid the understanding of the color grader of the local image structure/color properties; however, the models are not then modifiable in the simple regime annotation system. More particularly, the colorist can use cursors 485 to select ranges (483, 484) of luminances to specify which colors belong to a bright light regime (encoded with regime descriptor "Light_1"), whether globally in the entire picture (if they don't problematically occur in other objects anyway), or locally for that co-encoded spatial region. Mutatis mutandis to showing the histogram of a selected image region, when selecting a range of pixels in a (e.g., local) histogram, the system may show the corresponding region(s) 481 to the color grader.

The color grader can also work with local measurement cursors (a tool of image interaction helpers may contain, for example, a spyglass cursor 402, which can set a crosshair 404, from which a corresponding luminance value can be displayed in a luminance panel 470. This panel may contain coded-in-input-image luminances, or actually measured scene luminances. For example, luminances of a centre of the light Lc=5000, of selections where the light is less bright (L1=4000) being critical for optimally specifying the regime, if desired particular algorithmic transformations etc., and of the surround (L2=250), etc. The luminance panel 470 may have additional corresponding panels for allowing the color grader to specify which original scene measurements the color grader desires to be co-saved.

For example, with reference now to FIGS. 4 and 5, although the light may have a code 5000 in the captured input picture 1, it may have a luminance of 9000 Cd/m$^2$ in the actual scene, as captured in situ of the camera 542, so this value may be co-stored with the other descriptive data (D) for region 442, or a ratio or other derived property may be stored. Vice versa, a sampling cursor 480 in property representations can map to the geometrical image, e.g. by placing crosshairs 404. This is merely a simple exemplary conceptual description, the skilled person understands that complex tools can be generated, for example, to indicate sub-histograms and modifications, tracking what happens qua image rendering, or the number of selected pixels or shape of the regime, etc., with interactions of the color grader.

In yet another example, the color grader may want to specify two kinds of regimes for the highlight rendering, one with a smoother gradient, and one with only a couple of different luminance values (which may show highly banded on a quality display (i.e., with HDR), yet not on a mobile outdoors display (i.e., with LDR)), and these may map with spatial clickable indicators on top of the movie image, so that the color grader can quickly toggle between them. That is, the high quality display for reviewing may then emulate typical outdoors sunlight, lowering the image quality. Thus, by simulating, one can quickly overview which luminance positioning works best under certain situations, before coding some or all of this. The overview of luminance positioning may include reviewing the ratio of the average luminance of a first region, e.g., a light, versus a second region, e.g., the wall around the light.

Because regime coding may oftentimes be linked to the rendering of ranges corresponding to pixel regions/objects which may or may not be actually specified regimes, this regime coding also relates to the transformations of these regimes. Typically, whether converting to a low dynamic range (LDR) or a high dynamic range (HDR) image representation, one may want to apply tone mapping curves on pixel regions or subsets of pixels (e.g., corresponding to the regions). For the light example selected in rectangle region 442 (FIG. 4), one may have already prescribed tone mapping for wall values, not necessarily only surrounding the light in rectangle region 442, but typically for the major amount of well lit pixels in the entire image. Tone reproduction modification panel 460 allows making such changes (while being able to judge the effects on the grading display 540 (FIG. 5) and to wisely select the (e.g., light) regimes (in particular, e.g., to which ranges of the reproducible gamut of the receiving display those should map) in correspondence with the look of other regions/elements of the image.

So in this simple example, the color grader may want to specify as further image region identification data in the descriptive data (D) the rectangle region 442 data (coordinates of top-left and size), and/or the range of the identified sub-histogram C1 identified by the color grader ($L_{min1}$, $L_{max1}$). Both the image analysis apparatus/software 500 at the creation side and the receiving display, or any intermediate apparatus, may further finetune this region identification information. For example, by means of a segmentation module 522, the actual light elliptical shape may be determined. In addition, smart algorithms of the segmentation module 522 may not need accurate specification of the range in the luminance histogram, since the smart algorithms can use these as guidance seeds in a mode which segments, taking into account dominant image edges on the borders of image objects. Furthermore, as to what the receiving display should do with the identified regime, as said above the receiving display may either use a default proprietary transformation according to only a few predefined standardized regimes (e.g., make the lights as bright as possible); however, the artist or color grader may find that look excessively ugly, and more tightly specify, if not the actual processing of the receiving display, then at least in what final rendering look (output luminances/colors) that processing would result.

With buttons 434 (FIG. 4), the artist or color grader may specify a multiplier 435 which states, for example, that preferably the lights should not be brighter than 10 times the brightness of the average luminance image regions (the ones which are typically optimally illuminated when capturing the scene, and which will get allocated a large part of the LDR gamut). The artist or color grader may specify the luminances of different regimes compared to each other, determined on new physical quantities, for example, like impact, or annoyance. More particularly, depending on the receiving side display white luminance, patches of certain size and brightness may distract too much from the actual action in a movie, so the artist or color grader may with a parametric equation specify their absolute or relative luminance levels, to take these quantities like annoyance into account. For example, a relative luminance level can be a luminance level relative to surrounding image regions, or display surroundings, and/or a local average luminance, etc. Accordingly, parameters specifying the rendering on the receiving display (i.e., typically the image processing algorithms it will perform) can be of various types, including actual parameters for mathematical image processing functions, but also parameters. Those parameters can comprise, for example, parameters encoding a rough approximation shape specified with line segments 250 into which a curve should fall, e.g., a reflection profile as in FIG. 2 (leaving some room for different processing to the receiving display, but not too much).

With reference again to FIGS. 4 and 5, a more complex example is the "Unhide" regime 426 applied to the identified monster region 441 (which the grader may have outlined with medium precision, i.e. not just an ellipse, but not pixel accurate, and then the segmentation module 522 may collocate the region 441 with the object boundaries, and a motion tracker 524 may track it in successive images). The difficulty here lies in the receiving display rendering however. The purpose is that the rendering of the monster is or isn't just visible in the dark (the color grader may specify that the monster's face is barely visible and its body not yet), which inter alia depends on the exact surrounding pixels (so a spatial profile may need to be applied, and this may have to be finetuned with spatial profile allocation panel 490 and module 590).

For the user's convenience in changing the intended rendering, profile shapes may be specified not just in luminances, but also in other calibrated units, such as JNDs (for one or several typical display scenarios). For optimal effect, this also depends on calibration of the images/video for the receiving display in its environment. For example, upon startup of an optical disk movie, a blu-ray disc (BD) live application can ask the viewer if the viewer wants the optimal experience, and show the viewer a couple of dark patches which the viewer still has to differentiate with the viewer's room lighting. In another example, a movie theatre may be calibrated, several times or at a few times, with a camera or other measurement devices for the displayed content in the back of the cinema, etc. Such issues are much better controlled by the color grader than ever by the cameraman and lighting director (especially, if computer graphics manipulation is involved). Further examples are presented herein below of what can be achieved by this system when classical camera capturing becomes impractical, especially for high dynamic range (HDR).

As other examples, the embodiments of the present discloser show how regimes can be used with subtypes for specifying rendering differences, and to match rendering with different categories of displays. Suppose that an image to be rendered includes an explosion, which geometrically covers a significant percentage of the image area. Boosting such an explosion too much may distract from the story, or even irritate. Similarly, the amount of boost of a fire, may depend on such parameters like area, time duration of presentation, color, surrounding colors. For example, one may want to render the sun very bright in a science fiction movie where one flies towards the sun, but less bright and relying more on hot colors, when rendering it in the sky in a desert scene. Accordingly, this could be encoded with "Brightlight_1" vs. "Brightlight_2", different regimes of high luminance rendering ranges.

In addition, returning again to the example of a fire, the amount of boost of the fire may also depend on the texture and/or structure of the fireball, e.g., how much dark smoke is covering it. Furthermore, if there is more smoke, one could make the in-between glow brighter, or at least psychovisually coordinate the colorimetry and especially the luminance relation of those two sub-regions. Accordingly, subclasses of the fireball regime could include "Fire_Hardly_Covered" for 100-80% coverage, "Fire_Partly_Covered" for 79-40% coverage, and "Fire_Largely_Covered" for 39-10% coverage with dark sub-regions.

With such additional regime characterizing information, such as, spatial properties, texture properties, object classes, artistic intent, etc., the different displays or apparatuses using the coded image can better tune their final rendering or transformations therefore. Also, the regimes can be used to map to smartly allocated luminance subranges of different displays (e.g., several "lights" and "whites", several "darks", several characteristic/control "greys", etc.).

In another example, take the rendering of a scene on two HDR displays that include (i) an intermediate, near future one with a display white luminance of 1500 nit, and (ii) a higher quality HDR display of 4000 nit display white luminance, and the rendering of the scene on a default "LDR/standard" display of 500 nit display white luminance. One can see these HDR displays as upgrades, in that there exists an additional "effect/boost" luminance range(s) above the capabilities of the lesser quality one. Naively, one could blindly boost all bright areas, e.g. the abovementioned fireball, or a light like the sun, or a street light. Whereas the effect may be powerful, but still acceptable on the 1500 nit display, on the 4000 nit display the bright region's rendering could have too excessive a brightness. Therefore, one could use the high end of the luminance range of the 4000 nit HDR display for other kinds of light source renderings (e.g., laser beams fired), and constrain the fireballs to a sub-range of lesser luminance. In the 500 nit LDR/standard display gamut, there is no room for all these different types of light regimes, so they are rendered in the same sub-range at the high luminance end of its gamut. The regime coding could give further specifics on how to render on the different kinds of display, e.g., instruct to simulate a different luminance with other light properties, e.g. make the light slightly more yellowish or bluish.

FIG. 5 shows an example of an image analysis apparatus 500 for allowing the user (color grader, colorist, director of photography, (computer graphics) artist, etc.) to create the color regime specifications (which can include automated creation of the same, as discussed further herein). The image analysis apparatus 500 includes at least an image processing unit 501, wherein the image processing unit 501 can comprise a dedicated color grading apparatus, or a generic processor (GPU) of a normal computer running color grading and regime creation software, according to the embodiments of the present disclosure. Typically the image processing unit 501 will have a large set of image analysis units (or software tools, or plugins, e.g., edge detectors, texture characterizers, human person identifiers, etc.) allowing intelligent pre-analysis of the input image, allowing creation of quick user interaction widgets (e.g., reshapeable spline contours) so that the artist has to spend minimal effort defining the regimes, their meaning, perhaps some linguistic explanation (which may, for example, be used if the movie is to be remastered later, by knowing the artist's intent), and what the receiving display should do. The output image (O) to be sent to the receiving display may just be a copy of the input image (I) from a main camera 542, but may also have been modified (e.g., by applying tone reproduction modification curves to selected regions) by an image modification unit 530, in which case the resulting image is what the artist would want to see on the calibration display 540.

In contrast to the embodiment shown in FIG. 3, a post-production color grader using the image analysis apparatus 500 of FIG. 5 may have a complex control panel 541 as user interaction means. A data handler 505 (ValHndlr) will take user input, for example, clicks on a button to move a cursor, and convert the user input into usable descriptive data (D), such as selected regional template colors. The data handler 505 is configured to communicate with other modules of the image processing unit 501. For example, data handler 505 can communicate with the histogram processor 520 (HistProc), which can then, e.g., if a new rectangle is selected, recalculate the histograms of all pixels inside thereof, map a set of Gaussians to the data, etc.

In addition, the data handler 505 is arranged to perform user interface interaction. User interface interaction can include not only showing, e.g., via grading display 540, the results from image analysis to the user (i) in an understandable way, but also (ii) in a way that allows easy interaction with those image analysis results. In one example, showing the results from image analysis can include emphasizing or pre-presenting special regions by automatic image analysis of the image properties. The automatic image analysis of image properties can include, not only luminance based image analysis, but also content recognition based image analysis, such as, in more advanced embodiments. In another example, showing the results from image analysis in an understandable way includes pre-showing regions and their multi-modal content by pseudo-coloring the geometry of the captured image, or pseudo-coloring property representations. Property representations can include, for example, histograms, or classification property graphs, such as a two-dimensional chart showing the extent of the region in numerical texture properties.

In yet another example, showing the results from image analysis in a way that allows easy interaction with those image analysis results includes showing what extra pixels are selected or how they get a different colorometric look, if the user manipulates the histogram, and providing feedback for user interactions. User interactions can include interactions not only to extract regime parameters, but also to reprogram the image analysis algorithms. For example, the image analysis algorithms of an image segmenter (i.e., segmentation module 522 (Segm) in FIG. 5) may be reprogrammed based on the user's new semantic designation input regarding the content and structure of the image and how it should artistically look.

With reference still to FIG. 5, the image processing unit 501 further includes a spatial modification module 590 (SpatM). The spatial modification module 590 allows the system to do all kinds of spatial action, e.g., it may apply a parametric (tuned by the artist) reshadowing profile to a selected region.

Data encoder 510 (DatFRM) formats the set of descriptive data (D) to a final output description data signal (DDO), i.e., although complex coding transformations may be used. Data encoder 510 may also simply copy selected histogram/range/color properties and/or parameters, the selected spatial information, processing algorithms, etc., directly in the signal DDO. Selected histogram/range/color properties and/or parameters can include, e.g., a minimum and maximum luminance, multipliers for specifying the relationship of a first and a second luminance, etc. Multipliers for specifying the relationship of a first and a second luminance can be determined, for example, by a mathematical formula for two sets of pixels. Selected spatial information can include e.g., parameters for a linear chain encoding of a selected image region. Lastly, processing algorithms can include, e.g., a mathematical tone reproduction curve to apply to the selected region pixels.

Image analysis apparatus 500 further includes a signal formatter 552 (SignFRM). Signal formatter 552 is configured to add regime data containing signal DDO to the image signal data O, to create a final picture signal S'. Note that image signal data O can include a potentially processed output, having been modified via image modification unit 530. The final picture signal S' may be stored on a blu-ray disk (BD) or other storage medium, indicated by reference numeral 550. But of course, if the output image data signal is directly transmitted/broadcasted (from a processing boot of a television studio, where colorimetric regime interference may be simple yet still occur nearly real-time), then the descriptive data signal DDO may also be transmitted, e.g., over a separate channel than the outputted images O, e.g., via the internet for a selective set of viewers.

As mentioned above, in one embodiment, the descriptive data signal DDO is transmitted over a separate channel than the outputted images O. Transmitting over a separate channel is in-line with providing backwards compatibility. For example, non paying customers may only get a lower color quality signal O (i.e., for use at least on a low dynamic range (LDR) rendering display), however paying customers may get the additional data DDO allowing the paying customers to get a much more perfect—artist intended rendering—on the paying customers' high quality display (e.g., high dynamic range (HDR) rending display). Another embodiment includes a scalable scenario, where several different quality image streams are possible. For example, a mobile viewer may select a lower priced, lower bitrate stream, but also a regime set to allow the mobile viewer to create an optimal rendering.

With reference still to FIG. 5, a second camera 543 (or optical measurement device such as a spectrometric camera) may be present for analyzing details of an object 544 (e.g., light-matter interaction properties, or further object properties). When capturing high dynamic range scenes, on the one hand one may need an excessive amount of image codifying data, and on the other hand one may capture more of the scene than is desirable. For example, blemishes of the décor may be captured, which the artist doesn't like to be rendered, or the rendering thereof is not necessarily very critical/important, or not even possible on some displays (e.g., in dark regions).

In accordance with an embodiment of the present disclosure, regimes can also be used to change the encodings, or more complex colorimetric modification encodings, of the underlying pixel images. For example, a "bad" camera (such as, one used in a pre-existing 1960's movie) may have captured a dark shadowy region on a wall with little texture detail (i.e., mostly noise). However, for rendering on high quality displays (e.g., HDR rendering displays), a color grader may want and/or need to show some texture in that dark shadowy region.

Showing some texture in the dark shadowy region can be accomplished, for example, by adding a last few bits with a different encoding. In other words, a computer graphics pattern of wall blemishes may be encoded to be added in the last few bits of the underlying wall image. The encoding of a computer graphics pattern of wall blemishes may also take into account artist/color grader optimized de-noising, which may be quantified in the DDO signals. For example, the optimized de-noising can be quantified in the DDO signal as either a mathematical denoising algorithm possibly with a residual profile, or a pixel value geometrical profile itself. The receiving display can, in response to the DDO signal, then take this into account to tune the receiving display's de-noising or other image improvement algorithms.

In one embodiment, the computer graphics or other encoding, such as discussed in the immediately preceding paragraphs, may be determined based on actual measurements of a scene object by a second camera/optical measurer 543 (FIG. 5). The second camera/optical measurer 543 can be configured for finely measuring fine textures, and fine changes in reflectance. A regime code "Shadow_1" can then immediately be linked to this additional data (e.g., fine textures, fine changes in reflectance, etc.) for the receiving display rendering.

The data handler 505 may also provide the artist or any post-operator with a user interface to influence the final image encoding of the picture (and potentially additional data). Influencing of the final image encoding, may include, for example, how the scratches on the wall, or any structural encoding, may be encoded to allow a certain look or looks at the receiving display end. Thereto, the apparatus 500 is constructed so that the data handler 505 can interact with the image modification unit 530 (ImMod), so that each re-specification of the colorist can directly be converted into a re-coding of at least some regions of the output image O. A re-specification could include, for example, a specification regarding an importance of a dark regime, and its need to be rendered more or less realistic, high quality, visually stunning, etc. In addition, vice versa, any re-codings can, via the data handler and the other image analysis modules, be shown to the artist as the output image with annotations (A), as indicated in FIG. 5. Re-codings may include, for example, lowering the amount of bits for encoding a region, possibly putting some of the fine texture encoding in a second encoding. In addition, some of the re-codings may, for example, model typical display rendering characteristics. Furthermore, any re-codings shown to the artist can also include, for example, spatial overlays of the regimes on the image O, which may be toggled ON/OFF, to show the actual colorimetric look for different modeled typical receiving displays.

Figure 6:
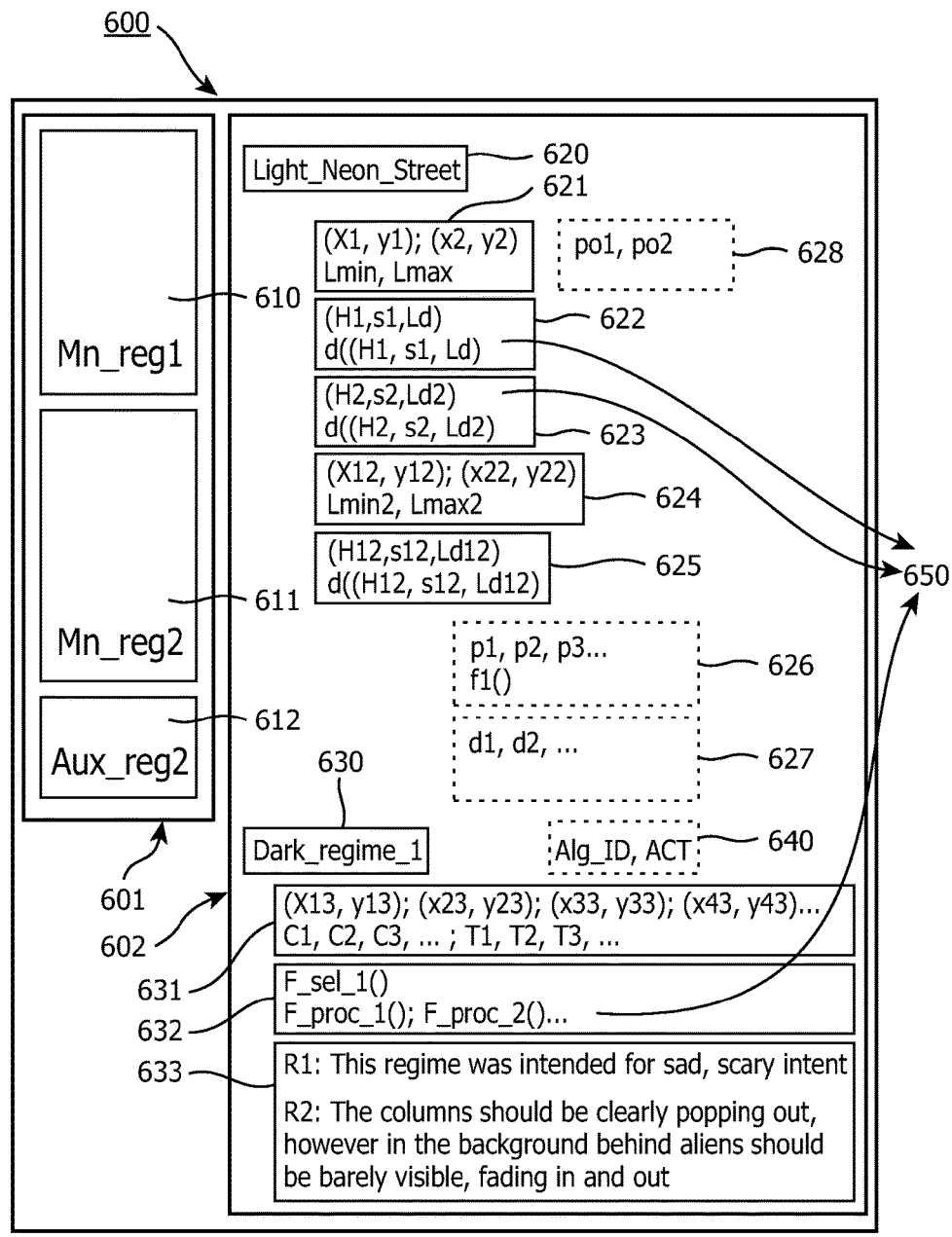
FIG. 6 schematically illustrates an image signal that can be used to communicate the rendering desires from the creation side to the display rendering side by means of luminance/color regime specifications.

FIG. 6 schematically illustrates how, according to one embodiment of the present disclosure, an image/video signal (e.g., compressed according to an MPEG standard like MPEG4.10 (AVC) or VC1, etc.) may be improved with color rendering regime descriptions. The skilled person can understand how this can be transmitted, e.g., over wireless or wired communication networks, so we will describe the following example in the light of storing on a memory medium. The memory medium may include an optical disk, harddisk, detachable memory card from a (consumer) video camera, etc. Typically, the captured video itself is stored, for example, as image signal 610 for a first region of at least one image, image signal 611 for a second image region, and there may also be an auxiliary signal 612. The captured video may comprise raw captured video, or could also comprise converted video, e.g., with tone reproduction curves. The captured video may further be stored as blocks of pixel values, DCT transformed, etc. In addition, the image signal 611 for the second region may be an overlay, e.g., a bottom ticker tape. The image signal 611 for the second region may also comprise the lighter regions of the image, e.g., if the first part only encodes captured pixel luminances below an upper value LCmax. Furthermore, the auxiliary signal 612 may comprise a signal for updating a region (e.g., of higher interest with higher precision bits.

In the added regime specification, there is at least one regime 620 specified together with its describing data. The added regime specification may be written, for example, as disk management data on a reserved set of tracks on a disk. In this example, the at least one regime 620 is "Light_Neon_Street" and it relates to neon lights in the current shot or scene of images. The describing data can include, for example, not only what its properties are in the inputted image on the receiving side O, and what to do with it, color rendering wise, but also, for example, sharpness processing that may have an impact on the color look. Note that regime 620 is also a first regime specification of the at least one regime. As will be understood further herein, there can also be additional regimes, such as, a second regime specification 630, e.g., "Dark_regime_1", etc.

With reference again to the first regime 620 "Light_Neon_Street", in a simple signal example, there may be first region identification information 621. The first region identification information 620 may, e.g., be the rectangle surrounding a first neon light (with upper-left and lower-right coordinates (x1,y1) and (x2,y2)). The first region identification information can alternatively include information enabling selecting a range of luminances (Lmin, Lmax), e.g., so as to further select only the slanted stripe (i.e., a subset of pixels) of the neon lamp. The range of luminances (Lmin, Lmax) can thus be used to select a given subset of pixels. In other words, the information contained in the first region identification information can enable selecting a subset of pixels in the image based upon a luminance range. One could also directly link, with linking data 628, to parts in the encoded video, e.g., by using pointers po1, po2 to the start and end of a set of DCT blocks. One could also have such a rectangle (or a subset of pixels selected based upon a luminance range) for each of the successive images in the shot, which allows tracking moving objects explicitly. More complex encodings may contain a selection algorithm "F_sel_1( )" to select the region (or subset of pixels) in one or more successive images. The selection algorithm may involve picture analysis such as region growing, snakes fitting, motion tracking with coded motion parameters, etc.

In addition to the first region identification information 621 of the at least one regime 620, there are first regime rendering parameters 622. In one embodiment, the first regime rendering parameters 622 may comprise one or more of a desired average hue (H1), saturation (s1), and luminance or lightness (Ld), characterizing the light for the corresponding regime. There may be further specifications on allowed deviations d(H1,s1,Ld). Allowed deviations d(H1,s1,Ld) can include, for example, spatial deviations, deviations per rendering display, to take into account the viewing room environment, etc.

Alternatively, complex models can be encoded to what the receiving display should preferably do taking into account various parameters, e.g., maximum achievable brightness (display white luminance) of the receiving display, consumer preference settings, etc. With respect to consumer preference settings, the consumer may prefer very dark rendering of a horror movie. With very dark rendering, the "shadow regimes" may be emphasized and rendered differently, but also, the non-shadow remaining parts of the image may be darkened. On the other hand, the consumer may desire to brighten the shadow regimes to make the movie less scary (e.g., the moment or gradualness by which a monster in the corridor becomes visible—keep the monster visible out of sync with the scary music).

In addition to first regime rendering parameters 622 associated with the first region identification information 621, there can be additional regime rendering parameters, e.g., second regime rendering parameters 623. Second regime rendering parameters 623 can be used to render the first neon light in a different way, e.g., on a different receiving display or with different settings. The embodiments of the present disclosure further include versatility which advantageously allows coding of different parts of the image under the same regime. One example of coding of different parts of the image under the same regime can include allowing second region identification information 624 and third regime rendering parameters 625 to do something different with a red and a green neon light, however still retaining some coordination. For example, the red and the green neon light chromaticities or spatial profiles may be handled differently, but they may be rendered at a similar perceived brightness.

Furthermore, the describing data for the at least one regime 620 may also be encoded with rendering tuning data 626 and/or additional improvement data 627. The encoded rendering tuning data 626 may include parameters (p1, p2, p3, . . . ) or processing functions (f1( )). The parameters (p1, p2, p3, . . . ) can be for tunable algorithms, like a saturation increaser. The encoded additional improvement data 627 (d1, d2, . . . ) can be to improve a decoded image region, e.g., by adding a graphics pattern (or any other additional encoding to add to the decoded local picture) as in the black wall example above, or doing some filtering for changing the look, e.g., dedicated artifact processing etc.

In addition to the first regime 620 discussed above, the regime specifications may also include a second regime 630 specified for the same image(s), e.g., how to handle the darker regions. This may be done, similarly as discussed with reference to the first regime, by adding third region identification information 631. For example, the third region identification information 631 can include any one or more of (i) a chain code or control points for a spline or other parameterized contour code (x13, y13); (x23,y23); (x33, y33); (x43,y43), . . . , and (ii) characteristic property data of the region (or subset) of pixels in the image O corresponding to the mentioned regime which may, e.g., be used as seeds or aid otherwise in a segmentation, which can be done at the receiving side, to extract the region (or subset) of pixels to be rendered in a prescribed way. Characteristic property data of the region (or subset) of pixels in the image O corresponding to the mentioned regime can include, for example, colors C1 C2, C3, . . . which may correspond to particular colors such as predominantly occurring colors. Similarly, characteristic property data of the region (or subset) of pixels in the image O corresponding to the mentioned regime can also include histogram modes or texture values T1, T2, T3, . . . . Other geometrical specifications can also be used, e.g., covering hierarchies of rectangles, etc. Furthermore, there may be regime specification functions 632, both (i) for extracting a particular region (or subset) of pixels (F_sel_1( )), and (ii) for processing the same, e.g., for rendering it on a main display (F_proc_1( )), or derive from it a rendering for an auxiliary display (F_proc_2( )).

As can be understood from the disclosure herein, the various parameters relating to average intended color and deviations (622, 623), bounding functions, goal functions, processing functions (F_proc_1( )), etc., are all examples of rendering specification data 650. Depending on how tight the algorithmic identity of the sending and receiving side is coordinated, the rendering specification data may further include algorithmic identification codes 640 that comprise an algorithm identifier (Alg_ID) and an action identifier (ACT). The algorithm identifier (Alg_ID) identifies which receiver side algorithms or type of algorithms are involved and the action identifier (ACT) identifies how the corresponding identified receiver side algorithms or type of algorithms should coordinate their action for intended rendering. For example, a receiver side algorithm may be as simple as the artist requesting that denoising should be switched off for a certain regime, or be applied to a certain strength. Of course, it is easier if, for example, a blu-ray player is arranged to correspond to what the new generation of disks desire, and handle all processing; but, it may then be preferable to still control something regarding the additional display processing.

Still further, the rendering specification data may also include a description field 633, allowing the artist to specify what the artist's intent was in rendering the regime, how this can actually be realized pshychovisually mathematically on the underlying image scene elements, etc. For example, the artist's intent could have been that "it should look dark and uninviting". Additionally, the artist's intent on how a regime can actually be realized could include, for example, "the columns should be conspicuously visible, yet the deeper parts of the cellar behind it should be rendered in a mysterious, difficult to discriminate way." This data descriptive, of the description field 633, can be used by a receiving-side transcoder on a later occasion, or be relayed to the final viewer via a user interface as textual description of the artist's intentions. Of course, more encodings could be added to this mere conceptual illustrative example.

Figure 7:
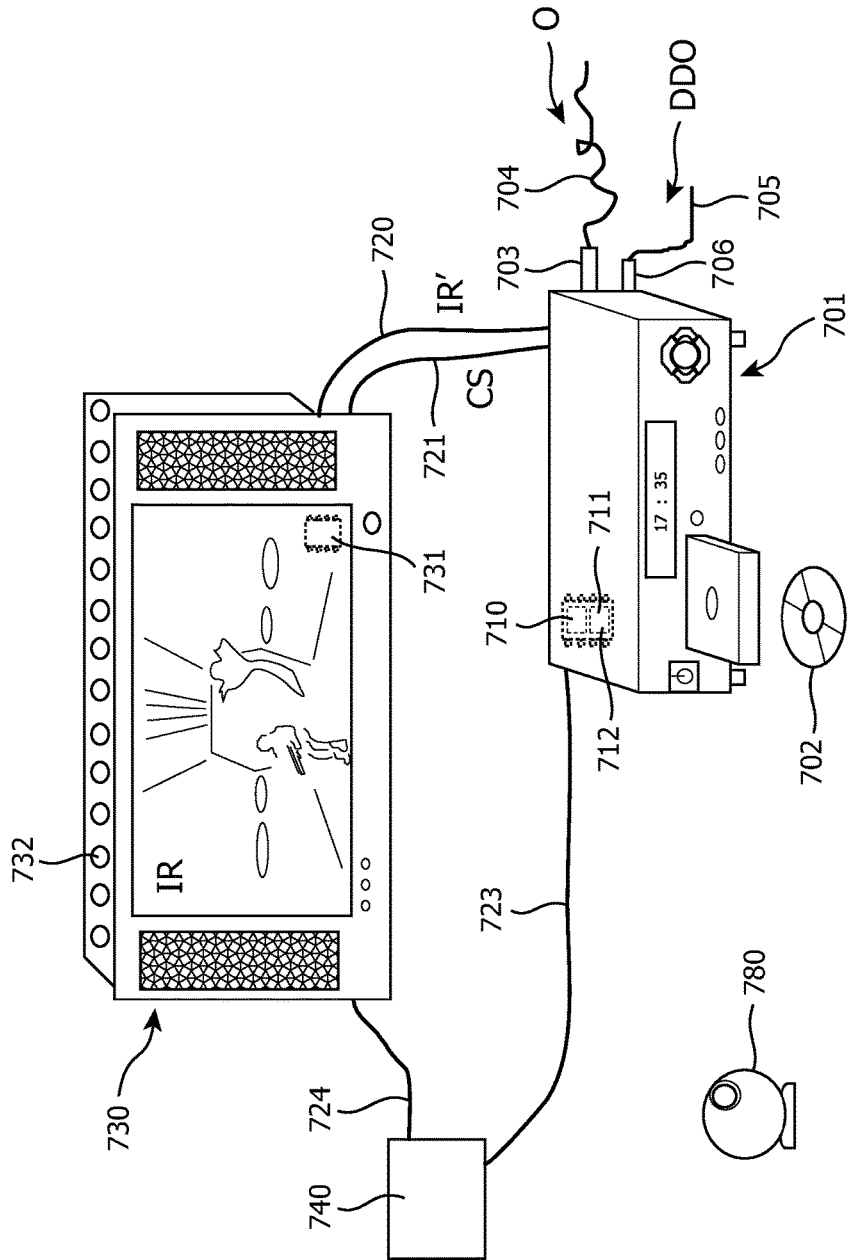
FIG. 7 schematically illustrates a display system on the receiving/rendering side, and apparatuses and components to extract regime specifications and to control the image processing for final rendering by the display system on the basis of the regime specifications.

FIG. 7 shows an exemplary image decoding and displaying system at the receiving side, e.g., in a consumer's living room. While FIG. 7 is just an illustrative example, it is noted that the skilled person will understand how a similar system according to principles of the various embodiments of the present disclosure can be implemented for a digital cinema theatre. An embodiment of color rendering image processing apparatus 701 is a set-top-box (STB) with built-in blu-ray reader. However, the color rendering image processing apparatus 701 may also comprise, for example, a laptop computer, or portable device like a mobile phone, etc. In addition, the color rendering image processing apparatus 701 can be as small as a plug-in card (i.e., as long as it is able to read the regime specifications, and allow color processing with the regime specifications), or as big as a professional cinema transcoding studio. Referring still to FIG. 7, the set-top-box with built-in blu-ray reader is able to receive a blu-ray disk (BD) 702 embodied with an entire regime-annotated image signal encoded on it, i.e., both an image signal O, and a description data signal DDO containing the descriptions of different occurring regimes. For example, the descriptions of different occurring regimes may include regime descriptions for a few artistically critical shots, e.g., where night horror action occurs, or blasts of exploding space ships, or vividly colorful dream sequences, etc.

Similarly, in one embodiment, the color rendering image processing apparatus 701 may have a first connection 703 to a television signal transmission cable 704, which carries the (typically compression encoded) input image (O) or image signal. In another embodiment, the first connection 703 may also comprise a connection to an antenna, an input for digital photos on a memory card, etc. In addition, image signal, as used herein, may also be interpreted to refer to a television standard encoded signal, a raw image file, etc. Furthermore, the description data (DDO) may come over another medium, e.g., via a second connector 706 connected to the internet 705 and a webpage (not shown) providing an image improvement service.

As disclosed herein, output description data signal (DDO) related to input image signal (O) can reasonably be interpreted as follows. Although the related DDO and O signals may typically be encoded on the same storage, or receivable via the same transmission, at least some means is provided to retrieve the additional output description data signal (DDO), which corresponds to at least some pixel region (or at least some subset of pixels) of some image of the input image signal (O).

Accordingly, in one embodiment, image processing apparatus 701 includes an integrated circuit (IC) 710 which has at least an extractor 711 arranged to extract from the output description data signal (DDO) the regime encoding data, and either output it directly or convert it to new values more suitable for doing controlled image processing by an image processing unit 712. This may be embodied so simple as to only apply some tone reproduction transformations to the pixels corresponding to the special to be rendered regime, or have complex algorithms, e.g. typically corresponding to any of the algorithms that can be applied at the creation side, e.g., a segmentation and/or tracking algorithm/unit.

In another embodiment, image processing apparatus or player 701 may output its improved intended rendering output image IR' to the receiving-side display/television 730 over a video cable 720 (e.g., an HDMI cable). In another embodiment, the television 730 may do, or be requested to do, additional processing, via its image analysis and/or processing IC 731, and thus, image processing apparatus 701 may also include a second connection (cable or wireless) 721 for communicating control signals (CS) to the television 730. The control signals (CS) may comprise any data from the output description data signal (DDO) and/or control data derived there from. Typically, additional control signals may be added over the video cable, by updating, e.g., the (wireless) HDMI protocol.

In yet another embodiment, the image processing apparatus 701 may also send color signals over connection 723 to a second, environment color display 740, which may also obtain its intended rendering color input signals via connection 724 and the receiving-side display 730. The exemplary display 730 can include a LED backlight 732, ideal for high-dynamic range (HDR) rendering. Environment measurement devices like measurement device 780 may be present, e.g., an inexpensive camera which can check the surround of the television, lights in the room, reflections on the television front plate, visibility of calibration grey scales, etc. The environment measurement devices may communicate measured environment information to image processing apparatus 701 and/or receiving-side display 730. In addition, the environment measurement devices may generate an input for colorimetrically (e.g., luminance and/or chromaticity) controlling several apparatuses in a room, such as displays, lights, shutter glasses, etc.

By now it should be appreciated that there has been provided a method of processing an input image signal (O) that comprises video images which are encoded in a video transmission encoding suitable for communicating video to a video rendering-side, the video images for being processed to be rendered on one of various rendering-side video displays having different output luminance dynamic ranges, and the processing being based on display rendering specification information or descriptive data (D) of an output description data signal (DDO) related to the video images. The method comprises: extracting from an encoding of the output description data signal (DDO), the display rendering specification information or descriptive data (D) specifying at least one luminance regime, wherein the display rendering specification information or descriptive data (D) comprises (i) identification information for at least one subset of pixels of an input video image, wherein the identification information includes at least one luminance value ($L_{min}$) demarcating pixels having luminance respectively above or below the at least one luminance value ($L_{min}$) and (ii) regime descriptor (rd) information that encodes a luminance rendering specification for the demarcated pixels for at least two of the various rendering-side video displays having different output luminance dynamic ranges, wherein the regime descriptor (rd) information comprises a parametric formulation of an intended luminance rendering as a function of at least a display white luminance; determining a value of the display white luminance of a particular rendering-side video display of the various rendering-side video displays having different output luminance dynamic ranges; and image processing the input image signal (O) to obtain an output image (IR) for the particular rendering-side video display to be rendered based upon a processing determined from at least (i) the display white luminance value of the particular rendering-side video display, and (ii) the parametric formulation of the intended luminance rendering as a function of at least a display white luminance.

In one embodiment, the method includes image processing that further applies, in response to the regime descriptor (rd) information, at least one of (i) atone mapping function applied on, and (ii) a color transformation based on, at least the luminance of pixels in the input video image corresponding to the at least one subset of pixels demarcated by the identification information.

In another embodiment, there has been provided a non-transitory computer-readable medium embodied with instructions executable by a processor for causing the processor to perform the method for processing an input image signal (O) that comprises video images which are encoded in a video transmission encoding suitable for communicating video to a video rendering-side, the video images for being processed to be rendered on one of various rendering-side video displays having different output luminance dynamic ranges, and the processing being based on display rendering specification information or descriptive data (D) of an output description data signal (DDO) related to the video images.

In yet another embodiment, there has been provided an apparatus for processing an input image signal (O) that comprises video images which are encoded in a video transmission encoding suitable for communicating video to a video rendering-side, the video images for being processed to be rendered on one of various rendering-side video displays having different output luminance dynamic ranges, and the processing being based on display rendering specification information or descriptive data (D) of an output description data signal (DDO) related to the video images. The apparatus comprises an extractor and a processing unit.

The extractor is adapted to extract from an encoding of the output description data signal (DDO), the display rendering specification information or descriptive data (D) specifying at least one luminance regime, wherein the display rendering specification information or descriptive data (D) comprises (i) identification information for at least one subset of pixels of an input video image, wherein the identification information includes at least one luminance value ($L_{min}$) demarcating pixels having luminance respectively above or below the at least one luminance value ($L_{min}$), and (ii) regime descriptor (rd) information that encodes a luminance rendering specification for the demarcated pixels for at least two of the various rendering-side video displays having different output luminance dynamic ranges, wherein the regime descriptor (rd) information comprises a parametric formulation of an intended luminance rendering as a function of at least a display white luminance.

The processing unit is adapted to image process the input image signal (O) for a particular rendering-side video display of the various rendering-side video displays having different output luminance dynamic ranges to obtain an output image (IR') to be rendered, based upon a processing determined from at least (i) a value of display white luminance of the particular rendering-side video display, and (ii) the parametric formulation of the intended luminance rendering as a function of at least a display white luminance. In another embodiment, the apparatus includes wherein the processing unit is further adapted to apply, in response to the regime descriptor (rd) information, at least one of (i) a tone mapping function applied on, and (ii) a color transformation based on, at least the luminance of pixels in the input video image corresponding to the at least one subset of pixels demarcated by the identification information.

In a further embodiment, there has been provided a method of processing an input signal including descriptive data (D) of a description data signal (DDO) representative of an original image to be rendered on one of various rendering-side video displays having different output luminance dynamic ranges. The method comprises: extracting from the input signal the descriptive data (D) specifying at least one luminance regime, wherein said descriptive data (D) comprises (i) identification information demarcating at least one subset of pixels of the original image included in the at least one luminance regime, and (ii) regime descriptor (rd) information that encodes a luminance rendering specification for the demarcated at least one subset of pixels for at least two of the various rendering-side video displays having different output luminance dynamic ranges, wherein the regime descriptor (rd) information comprises a parametric formulation of an intended luminance rendering of the at least one luminance regime as a function of at least a display white luminance; and processing the extracted descriptive data (D) to effect rendering of an image representative of the original image in response to (i) a value of display white luminance of a particular rendering-side video display of the various rendering-side video displays and (ii) the parametric formulation of the intended luminance rendering of the at least one luminance regime as a function of at least a display white luminance. In one embodiment, the method comprises wherein processing further includes applying, in response to the regime descriptor (rd) information, at least one of (i) a tone mapping function applied on, and (ii) a color transformation based on, at least the luminance of pixels in the original image corresponding to the at least one subset of pixels demarcated by the identification information.

In yet another embodiment, there has been provided a non-transitory computer-readable medium embodied with instructions executable by a processor for causing the processor to perform the method for processing an input signal including descriptive data (D) of a description data signal (DDO) representative of an original image to be rendered on one of various rendering-side video displays having different output luminance dynamic ranges.

In a still further embodiment, there has been provided an apparatus for processing an input signal including descriptive data (D) of a description data signal (DDO) representative of an original image to be rendered on one of various rendering-side video displays having different output luminance dynamic ranges. The apparatus comprises: an extractor for extracting from the input signal the descriptive data (D) specifying at least one luminance regime, wherein said descriptive data (D) comprises (i) identification information demarcating at least one subset of pixels of the original image included in the at least one luminance regime, and (ii) regime descriptor (rd) information that encodes a luminance rendering specification for the demarcated at least one subset of pixels for at least two of the various rendering-side video displays having different output luminance dynamic ranges, wherein the regime descriptor (rd) information comprises a parametric formulation of an intended luminance rendering of the at least one luminance regime as a function of at least a display white luminance; and a processing unit adapted to process the extracted descriptive data (D) to effect rendering of an image representative of the original image in response to (i) a value of display white luminance of a particular rendering-side video display of the various rendering-side video displays and (ii) the parametric formulation of the intended luminance rendering of the at least one luminance regime as a function of at least a display white luminance. In one embodiment, the apparatus includes wherein the processing unit is further adapted to apply, in response to the regime descriptor (rd) information, at least one of (i) a tone mapping function applied on, and (ii) a color transformation based on, at least the luminance of pixels in the original image corresponding to the at least one subset of pixels demarcated by the identification information.

In another embodiment, there has been provided a method of adding display rendering specification information to an input image (I) from a set of video images, the display rendering specification information being usable by a receiving-side luminance processing apparatus to control a rendering of luminances of subsets of image pixels corresponding to at least one luminance regime of respective images for at least two receiving-side video displays having different output luminance dynamic ranges. The method comprises: determining, via at least one of (i) an image processor and (ii) a display device with a user interface, display rendering specification information or descriptive data (D) specifying at least one luminance regime subset of pixels within the input image, wherein the display rendering specification information or descriptive data (D) comprises (i) identification information for the at least one luminance regime subset of pixels of the input image, wherein the identification information includes at least one luminance value ($L_{min}$) demarcating pixels having luminance respectively above or below the at least one luminance value ($L_{min}$), and (ii) regime descriptor (rd) information that encodes a luminance rendering specification for the demarcated pixels for the at least two receiving-side video displays having different output luminance dynamic ranges, wherein the regime descriptor (rd) information comprises a parametric formulation of an intended luminance rendering as a function of at least a display white luminance, so that a receiving-side luminance processing apparatus for a receiving-side video display can determine a final intended luminance rendering based upon (a) an actual value of display white luminance for the receiving-side video display and (b) the parametric formulation; and encoding (i) the display rendering specification information or descriptive data (D) into an output description data signal (DDO) as metadata in a video transmission encoding signal (S') suitable for communicating video to a receiving-side apparatus, and (ii) an image (O) of pixels, derived from the input image, according to a video transmission encoding definition for the video transmission encoding signal (S').

In one embodiment, the method includes wherein the regime descriptor (rd) information comprises at least one or more of a regime parameter and a regime function, further wherein the at least one or more of the regime parameter and the regime function are configured for effecting changes in luminance properties of a rendered image on a receiving-side video display, and wherein encoding further comprises encoding the at least one or more of the regime parameter and the regime function into the output description data signal (DDO). In another embodiment, the method includes wherein the identification information for the at least one luminance regime subset of pixels of the input image is further based upon at least one of (i) a luminance histogram of at least a portion of the input image, and (ii) an averaged light level over at least a portion of at least one input image. In a still further embodiment, the method includes wherein the image processor comprises one or more of a scene analysis device, a processor configured with automatic image analysis algorithms, and a transcoder. In yet another embodiment, the method comprises wherein the descriptive data (D) further includes specifications on how to map (i) at least one subset of luminance values of the input image, or (ii) at least one subset of pixels of the input image, to a sub-range of luminance values that the receiving-side video display is capable of rendering. In another embodiment, the different output luminance dynamic ranges comprise at least two of a high dynamic range (HDR), a low dynamic range (LDR), and dynamic ranges other than that HDR or LDR.

In another embodiment, there has been provided non-transitory computer-readable medium embodied with instructions executable by a processor for causing the processor to perform the method for adding display rendering specification information to an input image (I) from a set of video images, the display rendering specification information being usable by a receiving-side luminance processing apparatus to control a rendering of luminances of subsets of image pixels corresponding to at least one luminance regime of respective images for at least two receiving-side video displays having different output luminance dynamic ranges.

In a still further embodiment, there has been provided an image analysis apparatus for adding display rendering specification information to an input image (I) from a set of video images, the display rendering specification information being usable by a receiving-side luminance processing apparatus to control a rendering of luminances of subsets of image pixels corresponding to at least one luminance regime of respective images for at least two receiving-side video displays having different output luminance dynamic ranges. The apparatus comprises: an image processor configured to determine display rendering specification information or descriptive data (D) specifying at least one luminance regime subset of pixels within the input image, wherein the display rendering specification information or descriptive data (D) comprises (i) identification information for the at least one subset of pixels of the input image, wherein the identification information includes at least one luminance value ($L_{min}$) demarcating pixels having luminance respectively above or below the at least one luminance value ($L_{min}$), and (ii) regime descriptor (rd) information that encodes a luminance rendering specification for the demarcated pixels for the at least two receiving-side video displays having different output luminance dynamic ranges, wherein the regime descriptor (rd) information comprises a parametric formulation of an intended luminance rendering as a function of at least a display white luminance, so that a receiving-side luminance processing apparatus for a receiving-side video display can determine a final intended luminance rendering based upon (i) an actual value of display white luminance for the receiving-side video display and (ii) the parametric formulation; and an encoder configured to encode (i) the display rendering specification information or descriptive data (D) into an output description data signal (DDO) in a video transmission encoding signal (S') suitable for communicating video to a receiving-side apparatus, and (ii) an image (O) of pixels, derived from the input image, according to a video transmission encoding definition for the video transmission encoding signal (S').

In one embodiment, the apparatus includes wherein the regime descriptor (rd) information comprises at least one or more of a regime parameter and a regime function, further wherein the at least one or more of the regime parameter and the regime function are configured for effecting changes in luminance properties of a rendered image on a receiving-side video display, and wherein the encoder is further configured to encode the at least one or more of the regime parameter and the regime function into the output description data signal (DDO). In another embodiment, the apparatus includes wherein the identification information for the at least one luminance regime subset of pixels of the input image is further based upon at least one of (i) a luminance histogram of at least a portion of the input image, and (ii) averaged light level over at least a portion of at least one input image.

In a further embodiment, the apparatus includes wherein the processor comprises one or more of a scene analysis device, a data handler module, a histogram analysis module adapted to generate histograms of subsets of pixels of an input image, a segmentation module adapted to segment at least one subset of pixels in an input image in response to a receiving-side video display criterion, a processor configured with automatic image analysis algorithms, and a transcoder. In a still further embodiment, the apparatus comprises wherein the descriptive data (D) further includes specifications on how to map one or more of (i) at least one subset of luminance values of the input image, or (ii) at least one subset of pixels of the input image, to a sub-range of luminance values that the receiving-side video display is capable of rendering. In another embodiment, the apparatus includes wherein the different output luminance dynamic ranges comprise at least two of a high dynamic range (HDR), a low dynamic range (LDR), and dynamic ranges other than that HDR or LDR. Still further, in one embodiment, the descriptive data (D) is encoded into the output description data signal (DDO) is metadata.

As disclosed herein, the algorithmic components of the various embodiments of the present disclosure may, whether entirely or in part, be realized in practice as hardware (e.g., parts of an application specific integrated circuit or ASIC, or similar) or as software running on a special digital signal processor, or a generic processor, etc.

It should be understandable to the skilled person from the various embodiments of the present disclosure that various components may be optional improvements and can be realized in combination with other various components, and how (e.g., optional) steps of methods correspond to respective means of apparatuses, and vice versa. The word "apparatus" in this application is used in its broadest sense, namely a group of means allowing the realization of a particular objective, and can hence, e.g., be (a small part of) an integrated circuit (IC), or a dedicated appliance (such as, an appliance with a display), or part of a networked system, etc. "Arrangement" is also intended to be used in the broadest sense, so it may comprise, inter alia, a single apparatus, a part of an apparatus, a collection of (i.e., parts of) cooperating apparatuses, etc.

The computer program product denotation should be understood to encompass any physical realization of a collection of commands or instructions enabling a generic or special purpose processor, after a series of loading steps (which may include intermediate conversion steps, such as translation to an intermediate language, and a final processor language) to enter the commands into the processor, and to execute any of the characteristic functions according to one or more embodiments of the present disclosure. In particular, the computer program product may be realized as data embodied on a carrier such as, e.g., a non-transitory computer-readable disk or tape, data present in a memory, data traveling via a network connection (wired or wireless), or program code on paper. Apart from program code, characteristic data required for the program may also be embodied as a computer program product.

Some of the steps required for the operation of the method may be already present in the functionality of the processor instead of described in the computer program product, such as data input and output steps.

It should be noted that the above-mentioned embodiments illustrate rather than limit the invention. Where the skilled person can easily realize a mapping of the presented examples to other regions of the claims, the present disclosure has, for conciseness, not mentioned all these options in-depth. Apart from combinations of elements of the invention as combined in the claims, other combinations of the elements are possible. Any combination of elements can be realized in a single dedicated element.

Any reference sign between parentheses in a claim is not intended for limiting the claim. The word "comprising" does not exclude the presence of elements or aspects not listed in a claim. The word "a" or "an" preceding an element does not exclude the presence of a plurality of such elements.

The invention claimed is:

1. A method of processing an input image signal (O), wherein the input image signal (O) includes (i) video images (i)(a) coded for a given luminance dynamic range having a peak white luminance and (i)(b) encoded in a video transmission encoding suitable for communicating video to a video rendering-side, to be rendered on various rendering-side video displays having output luminance dynamic ranges with respective peak white luminances different from the peak white luminance of the given luminance dynamic range, based on display rendering specification information or descriptive data (D) encoded in an output description data signal (DDO) related to the video images, said method comprising:

extracting from the output description data signal (DDO), the display rendering specification information or descriptive data (D) that specifies at least one luminance regime based on (i) identification information for at least one subset of pixels of an input video image within the at least one luminance regime and (ii) regime descriptor (rd) information, wherein the identification information includes at least one luminance value ($L_{min}$) demarcating pixels having luminance respectively above or below the at least one luminance value ($L_{min}$), and wherein the regime descriptor (rd) information encodes a luminance rendering specification for (a) the demarcated pixels of the at least one luminance regime and (b) at least two of the various rendering-side video displays having output luminance dynamic ranges with respective peak white luminances different from the peak white luminance of the given luminance dynamic range, wherein the luminance rendering specification comprises a parametric formulation of luminance rendering for the at least one luminance regime as a function of at least a display white luminance, the display white luminance corresponding to a peak white luminance or maximum achievable brightness of a display;

determining a value of the display white luminance of a particular rendering-side video display of the at least two of the various rendering-side video displays having output luminance dynamic ranges with respective peak white luminances different from the peak white luminance of the given luminance dynamic range; and image processing the input image signal (O) to render a luminance regime improved output image (IR) on the particular rendering-side video display based upon at least (i) the determined value of display white luminance of the particular rendering-side video display, and (ii) the parametric formulation of the luminance rendering for the at least one luminance regime as a function of at least a display white luminance.

2. The method according to claim 1, wherein the image processing further applies, in response to the regime descriptor (rd) information, at least one of (i) a tone mapping function applied on, and (ii) a color transformation based on, at least luminance of pixels in the video images of the input image signal (O) corresponding to the at least one subset of pixels demarcated by the identification information.

3. A non-transitory computer-readable medium embodied with instructions executable by a processor for causing the processor to perform the method of claim 1, for processing an input image signal (O), wherein the input image signal (O) includes (i) video images (i)(a) coded for a given luminance dynamic range having a peak white luminance and (i)(b) encoded in a video transmission encoding suitable for communicating video to a video rendering-side, to be rendered on one of various rendering-side video displays having output luminance dynamic ranges different from the given luminance dynamic range, based on display rendering specification information or descriptive data (D) encoded in an output description data signal (DDO) related to the video images.

4. An apparatus for processing an input image signal (O), wherein the input image signal (O) includes (i) video images (i)(a) coded for a given luminance dynamic range having a peak white luminance and (i)(b) encoded in a video transmission encoding suitable for communicating video to a video rendering-side, to be rendered on one of various rendering-side video displays having output luminance dynamic ranges with respective peak white luminances different from the peak white luminance of the given luminance dynamic range, based on display rendering specification information or descriptive data (D) encoded in an output description data signal (DDO) related to the video images, said apparatus comprising:

an extractor adapted to extract from the output description data signal (DDO), the display rendering specification information or descriptive data (D) that specifies at least one luminance regime based on (i) identification information for at least one subset of pixels of an input video image within the at least one luminance regime and (ii) regime descriptor (rd) information, wherein the identification information includes at least one luminance value ($L_{min}$) demarcating pixels having luminance respectively above or below the at least one luminance value ($L_{min}$), and wherein the regime descriptor (rd) information encodes a luminance rendering specification for (a) the demarcated pixels of the at least one luminance regime and (b) at least two of the various rendering-side video displays having output luminance dynamic ranges with respective peak white luminances different from the peak white luminance of the given luminance dynamic range, wherein the luminance rendering specification comprises a parametric formulation of luminance rendering for the at least one luminance regime as a function of at least a display white luminance, the display white luminance corresponding to a peak white luminance or maximum achievable brightness of a display; and a processing unit adapted to image process the input image signal (O) for a particular rendering-side video display of the at least two of the various rendering-side video displays having output luminance dynamic ranges with respective peak white luminance different from the peak white luminance of the given luminance dynamic range, to render a luminance regime improved output image (IR') based upon at least (i) a determined value of display white luminance of the particular rendering-side video display, and (ii) the parametric formulation of the luminance rendering for the at least one luminance regime as a function of at least a display white luminance.

5. The apparatus according to claim 4, wherein the processing unit is further adapted to apply, in response to the regime descriptor (rd) information, at least one of (i) a tone mapping function applied on, and (ii) a color transformation based on, at least luminance of pixels in the video images of the input image signal (O) corresponding to the at least one subset of pixels demarcated by the identification information.

6. A method of processing an input signal including descriptive data (D) of a description data signal (DDO) representative of an original image (i) coded for a given luminance dynamic range having a peak white luminance and (ii) to be rendered on various rendering-side video displays having output luminance dynamic ranges with respective peak white luminances different from the peak white luminance of the given luminance dynamic range, the method comprising:

extracting from the input signal the descriptive data (D) that specifies at least one luminance regime based on (i) identification information demarcating at least one subset of pixels of the original image included in the at least one luminance regime, and (ii) regime descriptor (rd) information that encodes a luminance rendering specification for (a) the demarcated at least one subset of pixels of the at least one luminance regime and (b) at least two of the various rendering-side video displays having output luminance dynamic ranges with respective peak white luminances different from the peak white luminance of the given luminance dynamic range, wherein the luminance rendering specification comprises a parametric formulation of luminance rendering for the at least one luminance regime of the at least one luminance regime as a function of at least a display white luminance, the display white luminance corresponding to a peak white luminance or maximum achievable brightness of a display; and processing the extracted descriptive data (D) to effect rendering of a luminance regime improved image representative of the original image in response to (i) a determined value of display white luminance of a particular rendering-side video display of the at least two of the various rendering-side video displays and (ii) the parametric formulation of luminance rendering of the at least one luminance regime as a function of at least a display white luminance.

7. The method according to claim 6, wherein processing further includes applying, in response to the regime descriptor (rd) information, at least one of (i) a tone mapping function applied on, and (ii) a color transformation based on, at least luminance of pixels in the original image corresponding to the at least one subset of pixels demarcated by the identification information.

8. A non-transitory computer-readable medium embodied with instructions executable by a processor for causing the processor to perform the method of claim 6, for processing an input signal including descriptive data (D) of a description data signal (DDO) representative of an original image (i) coded for a given luminance dynamic range having a peak white luminance and (ii) to be rendered on various rendering-side video displays having output luminance dynamic ranges with respective peak white luminances different from the peak white luminance of the given luminance dynamic range.

9. An apparatus for processing an input signal including descriptive data (D) of a description data signal (DDO) representative of an original image (i) coded for a given luminance dynamic range having a peak white luminance and (ii) to be rendered on one of various rendering-side video displays having output luminance dynamic ranges with respective peak white luminances different from the peak white luminance of the given luminance dynamic range, the apparatus comprising:

an extractor for extracting from the input signal the descriptive data (D) that specifies at least one luminance regime based on (i) identification information demarcating at least one subset of pixels of the original image included in the at least one luminance regime, and (ii) regime descriptor (rd) information that encodes a luminance rendering specification for (a) the demarcated at least one subset of pixels of the at least one luminance regime and (b) at least two of the various rendering-side video displays having output luminance dynamic ranges with respective peak white luminances different from the peak white luminance of the given luminance dynamic range, wherein the luminance rendering specification comprises a parametric formulation of luminance rendering for the at least one luminance regime of the at least one luminance regime as a function of at least a display white luminance, the display white luminance corresponding to a peak white luminance or maximum achievable brightness of a display; and a processing unit adapted to process the extracted descriptive data (D) to effect rendering of a luminance regime improved image representative of the original image in response to (i) a determined value of display white luminance of a particular rendering-side video display of the at least two of the various rendering-side video displays having output luminance dynamic ranges with respective peak white luminances different from the peak white luminance of the given luminance dynamic range and (ii) the parametric formulation of luminance rendering of the at least one luminance regime as a function of at least a display white luminance.

10. The apparatus according to claim 9, wherein the processing unit is further adapted to apply, in response to the regime descriptor (rd) information, at least one of (i) a tone mapping function applied on, and (ii) a color transformation based on, at least luminance of pixels in the original image corresponding to the at least one subset of pixels demarcated by the identification information.

11. A method of adding display rendering specification information to an input image (I) from a set of video images coded for a given luminance dynamic range having a peak white luminance, the display rendering specification information being usable by a receiving-side luminance processing apparatus to control a rendering of luminances of subsets of image pixels corresponding to at least one luminance regime of respective images for at least two receiving-side video displays having output luminance dynamic ranges with respective peak white luminances different from the peak white luminance of the given luminance dynamic range, the method comprising:

determining, via at least one of (a)(i) an image processor and (a)(ii) a display device with a user interface, display rendering specification information or descriptive data (D) that specifies at least one luminance regime subset of pixels within the input image, wherein the display rendering specification information or descriptive data (D) is based on (b)(i) identification information for the at least one luminance regime subset of pixels of the input image, wherein the identification information includes at least one luminance value ($L_{min}$) demarcating pixels having luminance respectively above or below the at least one luminance value ($L_{min}$), and (b)(ii) regime descriptor (rd) information that encodes a luminance rendering specification for (b)(ii)(1) the demarcated pixels of the at least one luminance regime and (b)(ii)(2) at least two receiving-side video displays having output luminance dynamic ranges with respective peak white luminances different from the peak white luminance of the given luminance dynamic range, wherein the luminance rendering specification comprises a parametric formulation of luminance rendering for the at least one luminance regime as a function of at least a display white luminance, the display white luminance corresponding to a peak white luminance or maximum achievable brightness of a display, so that a receiving-side luminance processing apparatus for a receiving-side video display of the at least two of the various receiving-side video displays having output luminance dynamic ranges with respective peak white luminances different from the peak white luminance of the given luminance dynamic range can determine a luminance regime improved rendering based upon (a) a determined value of display white luminance for the receiving-side video display and (b) the parametric formulation; and encoding (i) the display rendering specification information or descriptive data (D) into an output description data signal (DDO) as metadata in a video transmission encoding signal (S') suitable for communicating video to a receiving-side apparatus, and (ii) an image (O) of pixels, derived from the input image, according to a video transmission encoding definition for the video transmission encoding signal (S').

12. The method according to claim 11, wherein the regime descriptor (rd) information comprises at least one or more of a regime parameter and a regime function, further wherein the at least one or more of the regime parameter and the regime function are configured for effecting changes in luminance properties of a rendered image on a receiving-side video display, and wherein encoding further comprises encoding the at least one or more of the regime parameter and the regime function into the output description data signal (DDO).

13. The method according to claim 11, wherein the identification information for the at least one luminance regime subset of pixels of the input image is further based upon at least one of (i) a luminance histogram of at least a portion of the input image, and (ii) an averaged light level over at least a portion of at least one input image.

14. The method according to claim 11, wherein the image processor comprises one or more of a scene analysis device, a processor configured with automatic image analysis algorithms, and a transcoder.

15. The method according to claim 11, wherein the descriptive data (D) further includes specifications on how to map (i) at least one subset of luminance values of the input image, or (ii) at least one subset of pixels of the input image, to a sub-range of luminance values within an output luminance dynamic range of the receiving-side video display.

16. The method according to claim 11, wherein the output luminance dynamic ranges different from the given luminance dynamic range comprise at least two of a high dynamic range (HDR), a low dynamic range (LDR), and dynamic ranges other than that HDR or LDR.

17. A non-transitory computer-readable medium embodied with instructions executable by a processor for causing the processor to perform the method of claim 11, for adding display rendering specification information to an input image (I) from a set of video images coded for a given luminance dynamic range having a peak white luminance, the display rendering specification information being usable by a receiving-side luminance processing apparatus to control a rendering of luminances of subsets of image pixels corresponding to at least one luminance regime of respective images for at least two receiving-side video displays having output luminance dynamic ranges with respective peak white luminances different from the peak white luminance of the given luminance dynamic range.

18. An image analysis apparatus for adding display rendering specification information to an input image (I) from a set of video images coded for a given luminance dynamic range having a peak white luminance, the display rendering specification information being usable by a receiving-side luminance processing apparatus to control a rendering of luminances of subsets of image pixels corresponding to at least one luminance regime of respective images for at least two receiving-side video displays having output luminance dynamic ranges with respective peak white luminances different from the peak white luminance of the given luminance dynamic range, the apparatus comprising:

an image processor configured to determine display rendering specification information or descriptive data (D) that specifies at least one luminance regime subset of pixels within the input image, wherein the display rendering specification information or descriptive data (D) is based on (i) identification information for the at least one luminance regime subset of pixels of the input image, wherein the identification information includes at least one luminance value ($L_{min}$) demarcating pixels having luminance respectively above or below the at least one luminance value ($L_{min}$), and (ii) regime descriptor (rd) information that encodes a luminance rendering specification for (ii)(a) the demarcated pixels of the at least one luminance regime and (ii)(b) the at least two receiving-side video displays having output luminance dynamic ranges with respective peak white luminances different from the peak white luminance of the given luminance dynamic range, wherein the luminance rendering specification comprises a parametric formulation of luminance rendering for the at least one luminance regime as a function of at least a display white luminance, the display white luminance corresponding to a peak white luminance or maximum achievable brightness of a display, so that a receiving-side luminance processing apparatus for a receiving-side video display of the at least two of the various receiving-side video displays having output luminance dynamic ranges with respective peak white luminances different from the peak white luminance of the given luminance dynamic range can determine a luminance regime improved rendering based upon (i) a determined value of display white luminance for the receiving-side video display and (ii) the parametric formulation; and an encoder configured to encode (i) the display rendering specification information or descriptive data (D) into an output description data signal (DDO) in a video transmission encoding signal (S') suitable for communicating video to a receiving-side apparatus, and (ii) an image (O) of pixels, derived from the input image, according to a video transmission encoding definition for the video transmission encoding signal (S').

19. The apparatus according to claim 18, wherein the regime descriptor (rd) information comprises at least one or more of a regime parameter and a regime function, further wherein the at least one or more of the regime parameter and the regime function are configured for effecting changes in luminance properties of a rendered image on a receiving-side video display, and wherein the encoder is further configured to encode the at least one or more of the regime parameter and the regime function into the output description data signal (DDO).

20. The apparatus according to claim 18, wherein the identification information for the at least one luminance regime subset of pixels of the input image is further based upon at least one of (i) a luminance histogram of at least a portion of the input image, and (ii) an averaged light level over at least a portion of at least one input image.

21. The apparatus according to claim 18, wherein the processor comprises one or more of a scene analysis device, a data handler module, a histogram analysis module adapted to generate histograms of subsets of pixels of an input image, a segmentation module adapted to segment at least one subset of pixels in an input image in response to a receiving-side video display criterion, a processor configured with automatic image analysis algorithms, and a transcoder.

22. The apparatus according to claim 18, wherein the descriptive data (D) further includes specifications on how to map one or more of (i) at least one subset of luminance values of the input image, or (ii) at least one subset of pixels of the input image, to a sub-range of luminance values within an output luminance dynamic range of the receiving-side video display.

23. The apparatus according to claim 18, wherein the output luminance dynamic ranges different from the given luminance dynamic range comprise at least two of a high dynamic range (HDR), a low dynamic range (LDR), and dynamic ranges other than that HDR or LDR.

24. The apparatus according to claim 18, wherein the descriptive data (D) encoded into the output description data signal (DDO) is metadata.

* * * * *